United States Patent
Natanzon et al.

(10) Patent No.: US 9,804,934 B1
(45) Date of Patent: Oct. 31, 2017

(54) PRODUCTION RECOVERY USING A POINT IN TIME SNAPSHOT

(71) Applicant: EMC Corporation, Hopkinton, MA (US)

(72) Inventors: Assaf Natanzon, Tel Aviv (IL); Saar Cohen, Moshav (IL); Anestis Panidis, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/585,777

(22) Filed: Dec. 30, 2014

(51) Int. Cl.
   *G06F 11/00* (2006.01)
   *G06F 11/14* (2006.01)

(52) U.S. Cl.
   CPC ...... *G06F 11/1469* (2013.01); *G06F 11/1453* (2013.01); *G06F 11/1464* (2013.01); *G06F 2201/84* (2013.01)

(58) Field of Classification Search
   CPC ............. G06F 11/2071; G06F 11/2082; G06F 11/1456; G06F 11/1435; G06F 11/1464; G06F 11/1461; G06F 11/1466; G06F 11/1471; G06F 11/20; G06F 11/2094; G06F 2201/84; G06F 2201/82
   See application file for complete search history.

(56) References Cited

U.S. PATENT DOCUMENTS

| | | | | |
|---|---|---|---|---|
| 7,469,358 B2 * | 12/2008 | Kaiya | .................. | G06F 11/1456 714/2 |
| 7,487,310 B1 * | 2/2009 | Bingham | ............ | G06F 11/1458 707/999.202 |
| 7,596,713 B2 * | 9/2009 | Mani-Meitav | ...... | G06F 11/1456 707/999.2 |
| 7,783,606 B2 * | 8/2010 | Chang | ................. | G06F 11/1466 707/623 |
| 8,489,831 B2 * | 7/2013 | Thompson | .......... | G06F 11/2071 711/162 |
| 8,655,846 B2 * | 2/2014 | Prahlad | ........................ | 707/620 |
| 9,015,121 B1 * | 4/2015 | Salamon | ............. | G06F 11/1438 707/640 |
| 9,098,455 B2 * | 8/2015 | Atluri | ................. | G06F 11/1453 |
| 2010/0082921 A1 * | 4/2010 | Thompson | .......... | G06F 11/2071 711/162 |

* cited by examiner

*Primary Examiner* — Nadeem Iqbal
(74) *Attorney, Agent, or Firm* — Krishnendu Gupta; Konrad R. Lee

(57) ABSTRACT

A system, computer program product, and computer-executable method for providing access to data on a primary data storage including a production Logical Unit (LU) in communication with a backup storage and a Data Protection Appliance (DPA), the system, computer program product, and computer-executable method comprising creating a snapshot of the production LU on the primary data storage, synthesizing a recovery snapshot at a Point in Time (PiT), wherein the recovery snapshot is the production LU at the PiT, and performing a restore operation on the snapshot of the production LU at the primary data storage using the recovery snapshot, wherein the snapshot of the production LU is restored to the production LU at the PiT, thereby creating a second recovery snapshot.

20 Claims, 21 Drawing Sheets

PRODUCTION RECOVERY USING A POINT IN TIME SNAPSHOT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A System, Computer program product, and computer-executable method for providing access to data on a primary data storage including a production Logical Unit (LU) in communication with a backup storage and a Data Protection Appliance (DPA), the System, Computer program product, and computer-executable method comprising creating a snapshot of the production LU on the primary data storage, synthesizing a recovery snapshot at a Point in Time (PiT), wherein the recovery snapshot is the production LU at the PiT, and performing a restore operation on the snapshot of the production LU at the primary data storage using the recovery snapshot, wherein the snapshot of the production LU is restored to the production LU at the PiT, thereby creating a second recovery snapshot.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
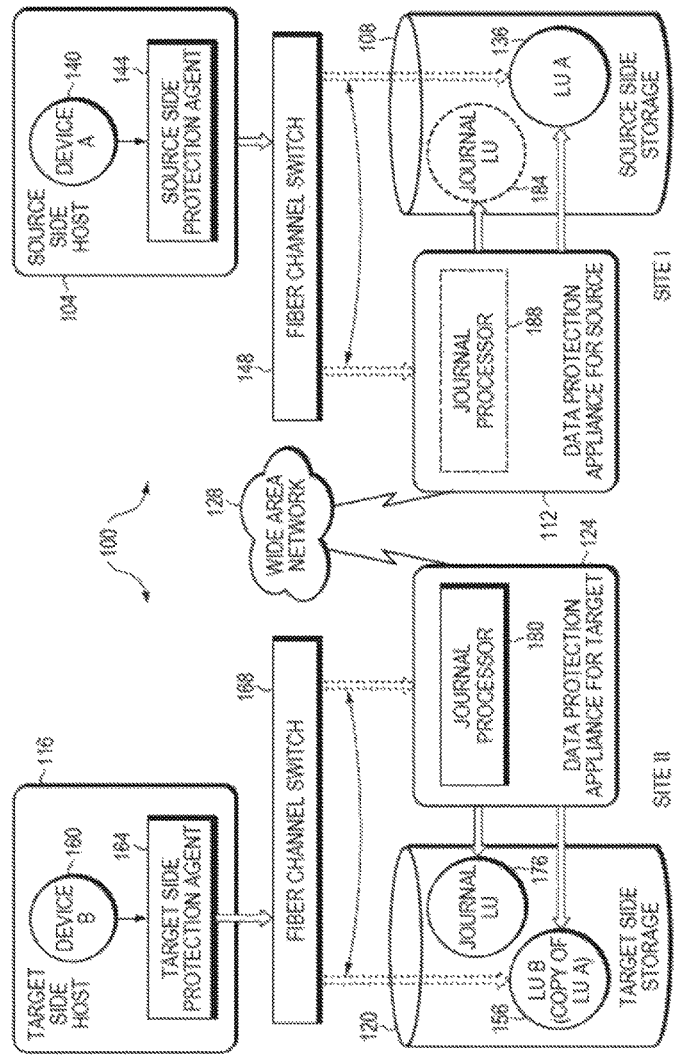
FIG. 1 is a simplified illustration of a data protection system, in accordance with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Systems, processes, and methods are discussed herein for enabling continuous data backups to deduplicated storage. In some embodiments, an initial backup snapshot of a source storage system may be created on the deduplicated storage using a data protection appliance. As changes are made to the source storage system, the IO's may be continuously communicated to the deduplicated storage for backup and protection.

In some embodiments, the deduplicated storage and/or data protection appliance may maintain journals, including data journals and metadata journals, for synthesizing new backup snapshots and/or recovering files. The journals may include DO and UNDO information compiled from IO's communicated from the data protection appliance to the deduplicated storage. These IO's may be applied to a backup snapshot to restore the snapshot to a previous point-in-time, or may be used to synthesize a new snapshot.

In an embodiment, data protection windows may be defined based on policy or user preference. The data protection windows may be used to maintain snapshots and/or journals for designated periods of time. For example, short-term windows may maintain both snapshots and journals for any point-in-time recovery (assuming the point-in-time falls within the short-term window). Mid-term windows, in contrast, may delete journals but maintain all the snapshots created during a period, and long-term windows may delete all the journals and select snapshots. Defining different protection windows may allow point-in-time recovery for files accessed recently, while also providing reduced storage consumption for long-term backups.

The systems discussed herein may additionally allow backup snapshots to be synthesized on deduplicated storage from IO's provided from multiple data protection appliance. For example, two data protection appliances may protect a single SAN. Each of those data protection agents may report IO's to the deduplicated storage, and a single backup snapshot may be synthesized from the journals maintaining those IO's The following non-limiting definitions may be helpful in understanding the specification and claims:

BACKUP SITE—may be a facility where replicated production site data is stored; the backup site may be located in a remote site or at the same location as the production site; a backup site may be a virtual or physical site.

CDP—Continuous Data Protection, may refer to a full replica of a volume or a set of volumes along with a journal which allows any point in time access, the CDP copy is at the same site, and maybe the same storage array of the production site.

DATA PROTECTION APPLIANCE ("DPA")—may be a computer or a cluster of computers, or a set of processes that serve as a data protection appliance, responsible for data protection services including inter alia data replication of a storage system, and journaling of I/O requests issued by a host computer to the storage system. The DPA may be a physical device, a virtual device running, or may be a combination of a virtual and physical device.

HOST—may be at least one computer or networks of computers that runs at least one data processing application that issues I/O requests to one or more storage systems; a host is an initiator with a SAN; a host may be a virtual machine.

HOST DEVICE—may be an internal interface in a host to a logical storage unit.

IMAGE—may be a copy of a logical storage unit at a specific point-in-time.

INITIATOR—may be a node in a SAN that issues I/O requests.

JOURNAL—may be a record of write transactions issued to a storage system. A journal may be used to maintain a duplicate storage system, and to rollback the duplicate storage system to a previous point-in-time.

LOGICAL UNIT—may be a logical entity provided by a storage system for accessing data from the storage system.

LUN—may be a logical unit number for identifying a logical unit. May also refer to one or more virtual disks or virtual LUNs, which may correspond to one or more Virtual Machines. As used herein, LUN and LU may be used interchangeably to refer to a LU.

PHYSICAL STORAGE UNIT—may be a physical entity, such as a disk or an array of disks, for storing data in storage locations that can be accessed by address.

PRODUCTION SITE—may be a facility where one or more host computers run data processing applications that write data to a storage system and read data from the storage system; may be a virtual or physical site.

RPA—may be replication protection appliance, and is another name for DPA. An RPA may be a virtual DPA or a physical DPA.

SAN—may be a storage area network of nodes that send and receive I/O and other requests, each node in the network being an initiator or a target, or both an initiator and a target.

SOURCE SIDE—may be a transmitter of data within a data replication workflow. During normal operation a production site is the source side, and during data recovery a backup site is the source side. Source side may be a virtual or physical site.

SNAPSHOT—a snapshot may refer to an image or differential representations of an image, i.e. the snapshot may have pointers to the original volume, and may point to log volumes for changed locations. Snapshots may be combined into a snapshot array, which may represent different images over a time period.

SPLITTER/PROTECTION AGENT—may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

STORAGE SYSTEM—may be a SAN entity that provides multiple logical units for access by multiple SAN initiators.

STREAMING—may mean transmitting data in real time, from a source to a destination, as the data is read or created.

SYNTHESIZE—may mean creating a new file using pointers from existing files, without actually copying the referenced data. For example, a new file representing a volume at a points-in-time may be created using pointers to a file representing a previous point-in-time, as well pointers to journal representing changes to the volume.

TARGET—may be a node in a SAN that replies to I/O requests.

TARGET SIDE—may be a receiver of data within a data replication workflow; during normal operation a back site is the target side, and during data recovery a production site is the target side; may be a virtual or physical site.

VIRTUAL VOLUME—may be a volume which is exposed to host by a virtualization layer, the virtual volume may be spanned across more than one site and or volumes.

VIRTUAL RPA (vRPA)/VIRTUAL DPA (vDPA)—may be an DPA running in a VM.

WAN—may be a wide area network that connects local networks and enables them to communicate with one another, such as the Internet.

Overview of a Backup System Using a Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side. The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands. System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators. Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer. A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system. Additionally or alternatively, the protection agent may be installed as part of the storage array IO stack. In some embodiments the DPA may be installed as a virtual appliance or as a set of processes inside the storage array.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124. In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B. During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal. Journal processor 180 functions generally to manage the journal entries of LU B.

Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
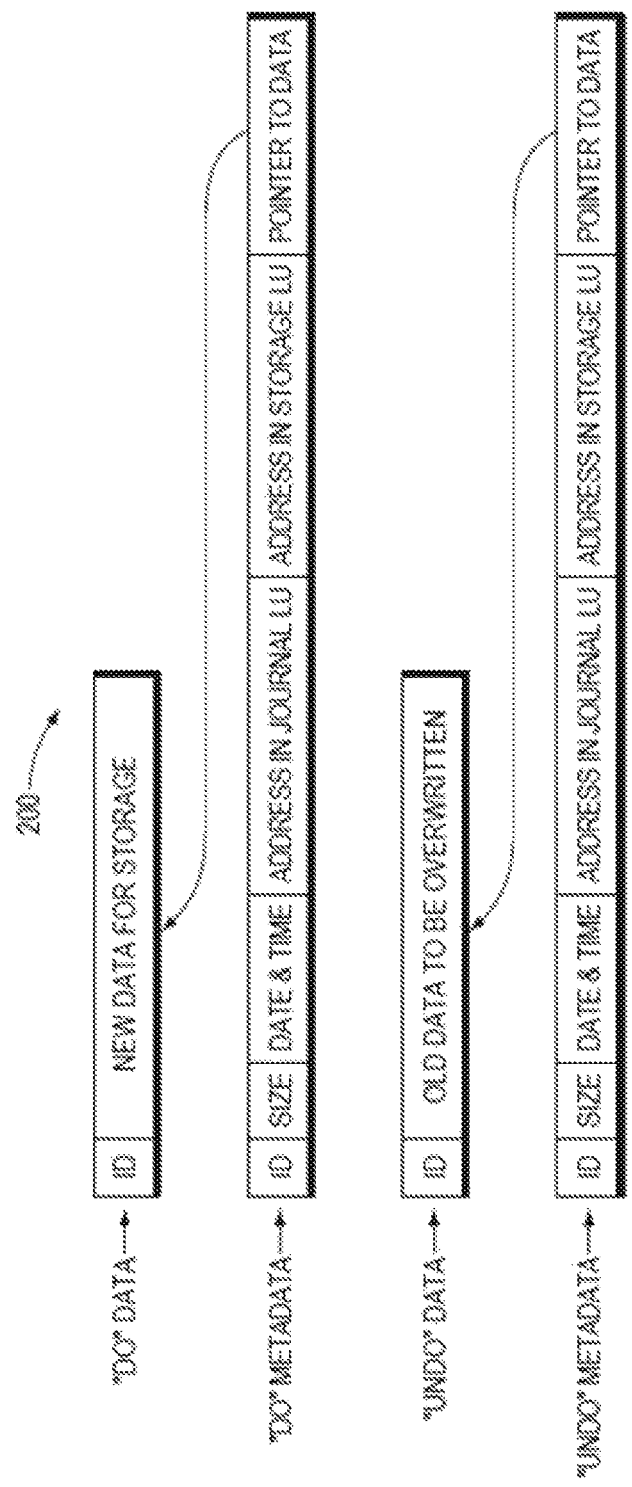
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:

one or more identifiers;

a time stamp, which is the date & time at which the transaction was received by source side DPA 112;

a write size, which is the size of the data block;

a location in journal LU 176 where the data is entered;

a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream. The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or asynchronous a fewer or greater number of streams may be used.

Initializing a Backup Snapshot on Deduplicated Storage

Figure 3:
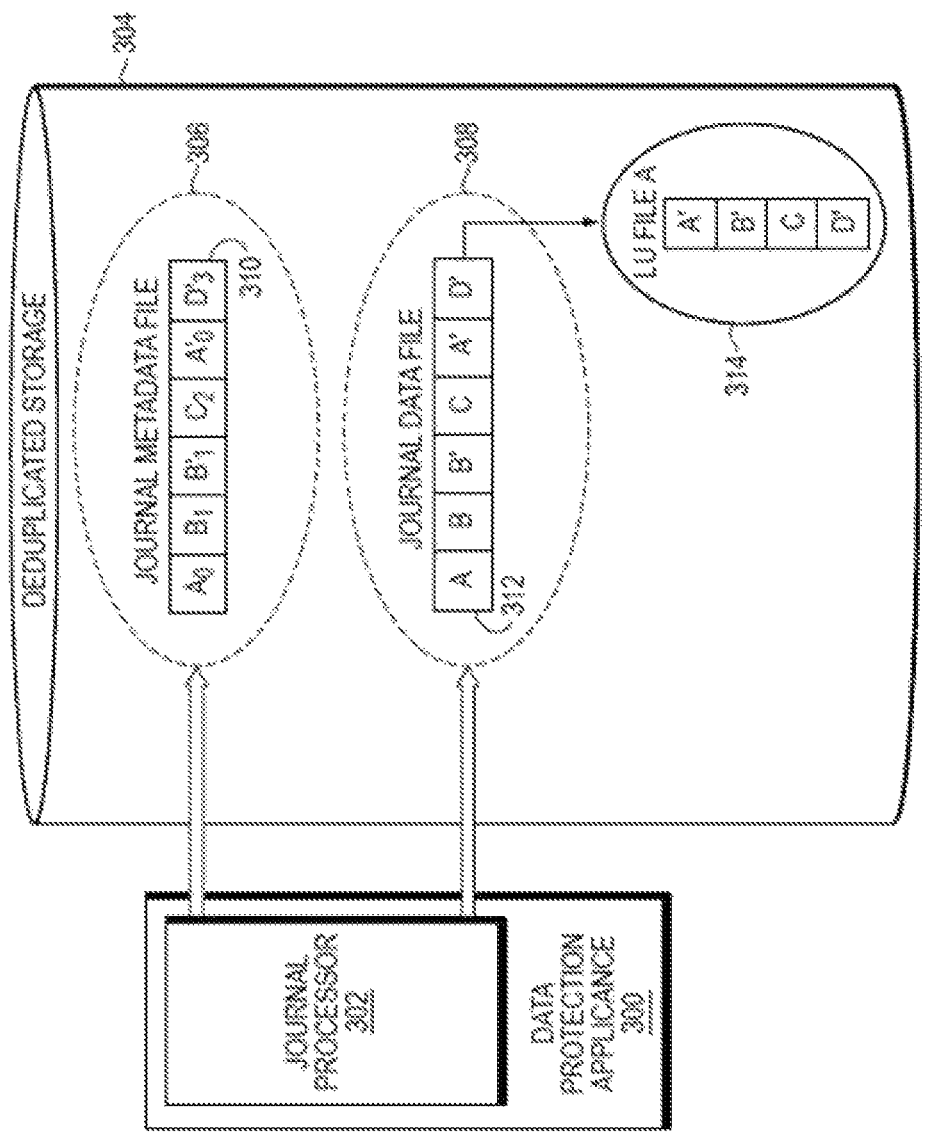
FIG. 3 is a system for initializing a backup snapshot, consistent with an embodiment of the present disclosure.
Figure 4:
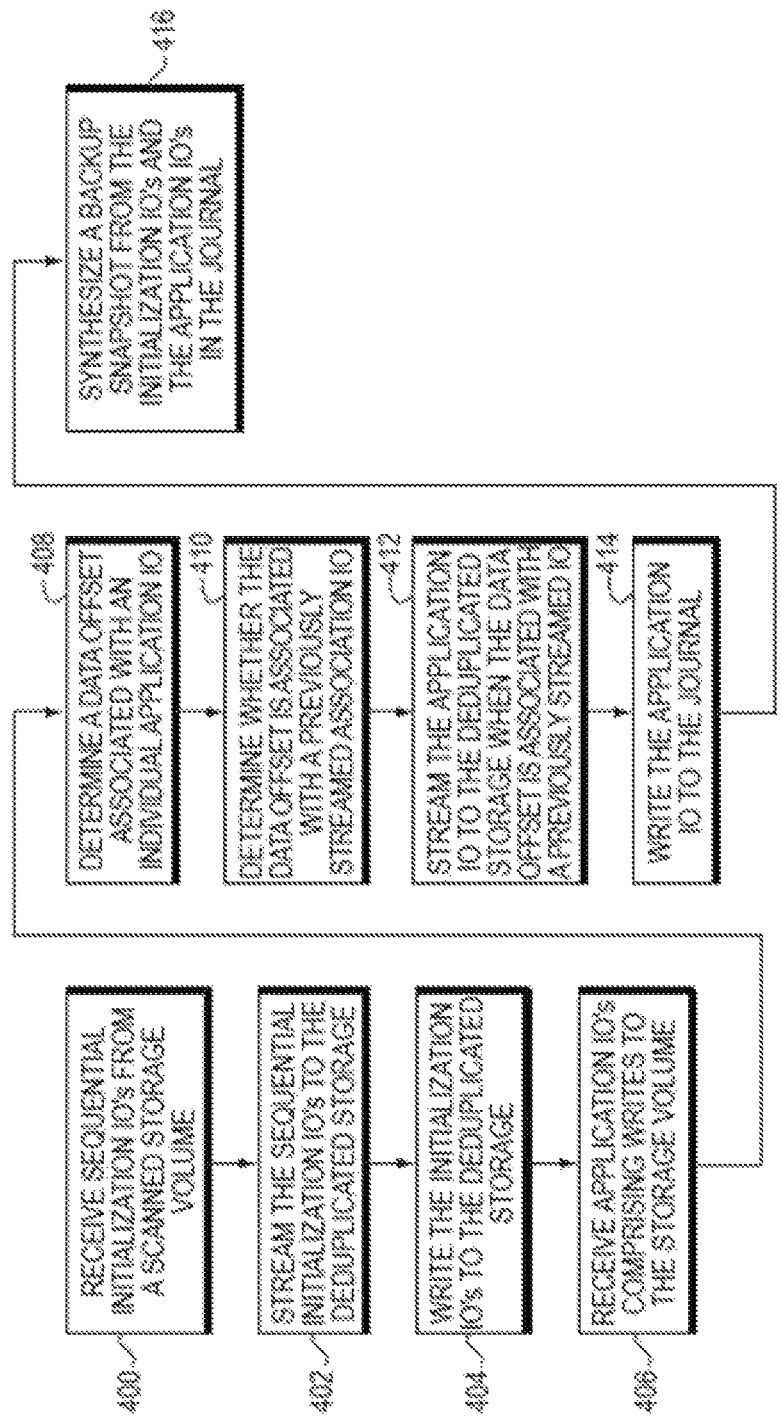
FIG. 4 is a flow chart for initializing a backup snapshot consistent with an embodiment of the present disclosure.
Figure 5:
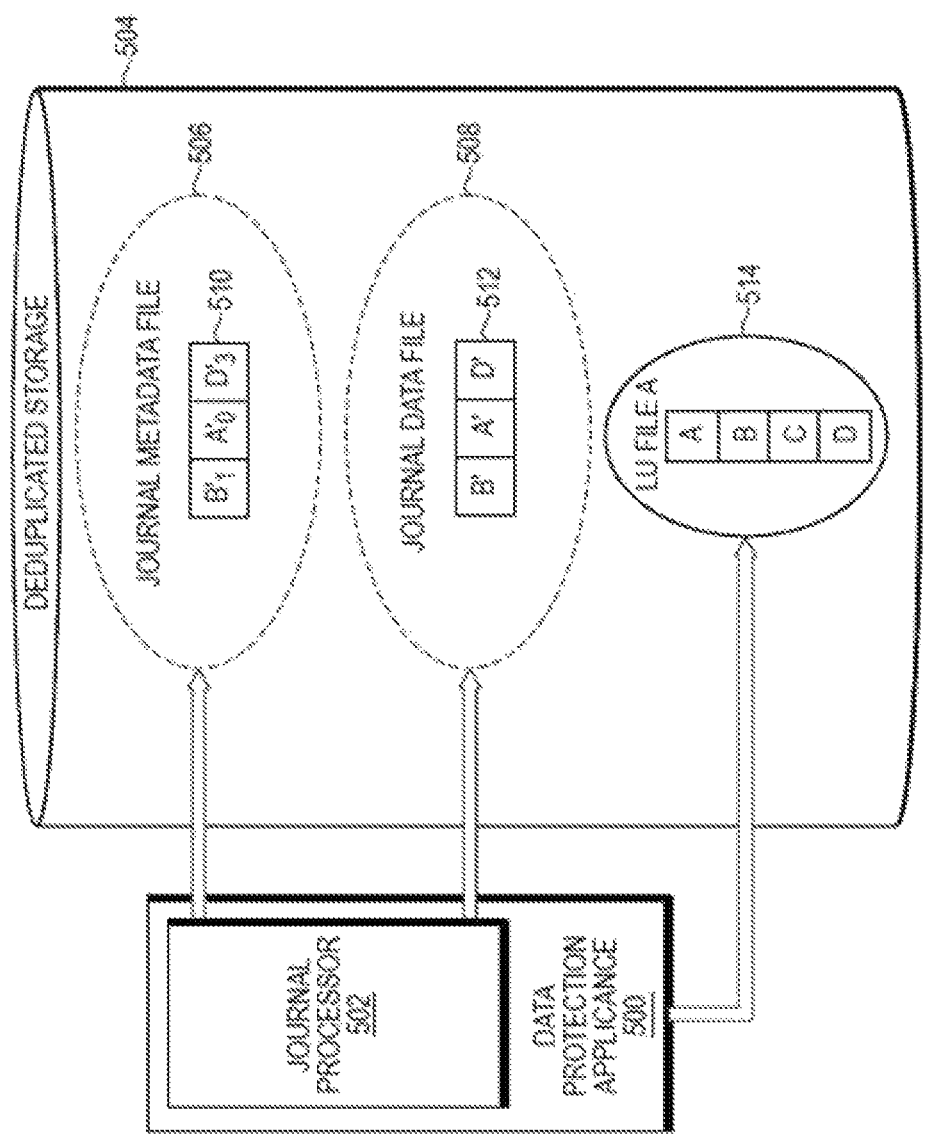
FIG. 5 is a system for initializing a backup snapshot, consistent with an embodiment of the present disclosure.

FIG. 3, FIG. 4, and FIG. 5 depict systems and processes for initializing a backup snapshot on deduplicated storage consistent with an embodiment of the present disclosure. Before deduplicated storage can provide continuous backup protection, it may be necessary to create an initial backup snapshot of the source storage system. This initial backup snapshot may represent the earliest point-in-time backup that may be restored. As changes are made to the source storage system, journal files and/or new backups may be updated and/or synthesized to provide continuous protection. In some embodiments, the initial backup snapshot may be created by streaming IO's from a storage system scan to a data protection appliance, or by taking an initial snapshot of the storage system and transmitting the entire snapshot to deduplicated storage.

FIG. 3 depicts a system for creating an initial backup snapshot by scanning a source storage system and streaming IO's to the deduplicated storage. Data protection application 300 may comprise journal processor 302, and may be in communication with deduplicated storage 304. In an embodiment, deduplicated storage 304 may be target side storage residing at a backup site. Data protection appliance 300 may be similar to data protection appliance 112 and/or 124, and may be responsible for streaming IO's to deduplicated storage 304.

In an embodiment, a source storage system may be scanned and individual offsets may be streamed to data protection appliance 300. The offsets streamed from the scanned system may be referred to as initialization IO's, and may be streamed sequentially to data protection appliance 300. For example, the scanned system may comprise offsets 0, 1, 2, and 3, comprising data A, B, C, and D. The initial scan may start at the beginning of the system, and transmit offset 0, followed by offset 1, et seq.

As data protection appliance 300 receives the initialization IO's, journal processor 302 may identify the offset data and metadata, and may stream the IO's to metadata journal 306 and/or data journal 308 residing on deduplicated storage 304. Data journal 308 may comprise data stored within an offset, and metadata 306 may include metadata associated with that offset. Metadata could include, for example, an offset identifier, size, write time, and device ID. These journals may then be used to synthesize a backup snapshot on deduplicated storage 304, as discussed below.

In some embodiments, a scanned storage system may operate in a live environment. As a result, applications may be writing to the storage concurrently with the scan process. If an application writes to a location that has already been streamed, the journal files and ultimately the synthesized snapshot may be out of date. To address this issue, application IO's may be streamed concurrently with the initialization IO's if the application IO's are to an offset that has already been scanned. For example, consider Table 1:

| Offset/Time | t0 | t1 | t2 | t3 |
|---|---|---|---|---|
| 0 | A |  |  | A' |
| 1 | B | B' |  |  |
| 2 | C |  |  |  |
| 3 | D |  | D' |  |

Table 1 depicts four different offsets, denoted as 0, 1, 2, and 3, and four times, t0, t1, t2, and t3. Letters A, B, C, and D may represent the data stored at the offsets. Time t0 may represent the offsets as they exist when the scan begins. These offsets may be streamed to data protection appliance 300 sequentially from 0 to 3. At time t1, however, the data at offset 1 is modified by an application from B to B'. Similarly, at t2 the data at offset 3 changes from D to D', and at t3 the data at offset 0 changes from A to A'. If the scan transmits the data at offset 1 before t1, B' may be missed since the change occurred after offset 1 was scanned and B was transmitted. Similarly, if the scan has not reached offset 3 before t2, only D' will be transmitted since D no longer exists. It may therefore be beneficial to transmit application IO's to data protection appliance 300 if those IO's write to an offset that has already been scanned. If the offset has not been scanned, it may not be necessary to transmit the application IO's because the change will be transmitted when the scan reaches that offset.

Turning back to FIG. 3 and with continued reference to Table 1, offset metadata journal entries 310 and offset data journal entries 312 depict the state of metadata journal 306 and data journal 308 after the initial scan is complete. While there are only four offsets on the scanned storage system, there are six entries in the journal because the data in offset 0 and 1 was modified by an application after they were scanned. They each therefore have two entries: B and B'. Segment D was modified after the scan began, but before it was reached. Segment D therefore only has one entry: D'.

Metadata journal entries 310 and data journal entries 312 may include all of the data necessary to synthesize a backup snapshot of the scanned storage system. Data journal entries 312 may contain the actual data from the storage system: A, B, B' C, A' and D'. Note that data D is not in the data journal 308 since it was modified on the storage system before its offset was scanned and transmitted. Metadata journal entries 310 may include metadata about the offsets. For example, metadata journal entries 310 may include an offset identifier, offset length, and write time, and volume/device ID. In the present example, metadata journal entries may include the entries shown in Table 2:

| | |
|---|---|
| 0. | Vol A, offset = 0; size = 8 kb; time = t0 |
| 1. | Vol A, offset = 8 kb; size = 8 kb; time = t0 |
| 2. | Vol A, offset = 8 kb; size = 8 kb; time = t1 |
| 3. | Vol A, offset = 16 kb; size = 8 kb; time = t0 |
| 4. | Vol A, offset = 0; size = 8 kb; time = t3 |
| 5. | Vol A, offset = 24 kb; size = 8 kb; time = t2 |

Table 2's metadata entries may correspond to the states shown in Table 1. The offset at location 0 may be offset 0, the offset at 8 kb may be offset 1, the offset at 16 kb may be offset 2, and the offset at 24 kb may be offset 3. The subscript of each journal entries 310 also identifies the offset associated with that metadata entry.

Deduplicated storage may use metadata journal 306 and data journal 308 to synthesize initial backup snapshot 314. First, metadata journal 306 may be queried to identify the most recent data associated with each offset. Next, the data may be retrieved from journal data file 308 and synthesized into backup snapshot 314. In some embodiments, synthesizing the backup snapshot may comprise creating and/or copying pointers rather than copying entire data blocks. This could be, for example, using a product such as EMC® DataDomain® Boost™

For example, once the initial scan is complete, data journal 308 includes data A, B, B', C, A', and D'. A' and B' are the result of application IO's occurring during the scan process, and therefore represent the present state of offsets 0 and 1. To create backup snapshot 314, deduplicated storage may therefore retrieve A', B', C, and D' from the data journal 308 and synthesize them together.

Once initial backup snapshot 314 is synthesized, journal entries 310 and 312 may no longer be needed. In an embodiment, they may be removed from deduplicated storage 304 in order to conserve space. Alternatively, they may remain in the journals.

Turning now to FIG. 4, a process for creating an initial backup snapshot is discussed. At block 400, sequential initialization IO's are received from a scanned storage volume. These IO's could be, for example, received at a data protection appliance, such as data protection appliance 300. In some embodiments, the initialization IO's are read from the scanned storage volume by the data protection appliance.

At block 402, the initialization IO's are streamed to a deduplicated storage. In an embodiment, the deduplicated storage may be substantially similar to deduplicated storage 304. In some embodiments, the initialization IO's are streamed to a data journal using a data stream, and to a metadata journal using a metadata stream. Each stream may be a file in the deduplicated storage. Additionally or alternatively, writes to the journal files may be done though the DDBoost API or any other API.

At block 404, the initialization IO's may be written to a journal on the deduplicated storage. This journal may be, for example, similar to metadata journal 306 and/or data journal 308. In an embodiment, these journals may be in the same journal files. Alternatively, these may be separate files on the deduplicated storage system.

At block 406, application IO's comprising writes to offsets on the scanned storage volume may be received. These application IO's may also be received at a data protection appliance, such as data protection appliance 300.

At 408, an offset associated with a specific application IO is identified, and at 410 it is determined whether the offset has already been streamed to the deduplicated storage. This determination could be made on data protection appliance 300 using journal processor 302. If the offset has already been streamed, it must have already been scanned and included in an initialization IO. If the offset has not been streamed, the storage volume scan may not have reached the offset on the storage volume.

At block 412, the application IO is streamed to the deduplicated storage if its offset was included in a previously streamed initialization IO. In an embodiment, the application IO is only streamed when its offset was included a previously streamed initialization IO. Streaming the application IO when its offset was included in a previous initialization IO ensures that writes to the scanned volume are not missed during the initialization processes. In some embodiments, the application IO's are streamed to a data journal using a data stream, and to a metadata journal using a metadata stream.

In an embodiment, application IO's are not streamed if they comprise writes to an offset that has not yet been scanned and streamed in an initialization IO. This is because the data created by the write will be included in the initialization IO once the scan reaches that offset. This may reduce traffic between the data protection appliance and the deduplicated storage, and may reduce the workload on the deduplicated because the data will only be processed once.

At block 414, the application IO is written to the journal. This journal may be the same journal as the initialization IO's, or it may be a separate journal. In an embodiment, the journal is data journal 308 and/or metadata journal 306.

Finally, at 416, a backup snapshot is synthesized from the initialization IO's and the application IO's. This snapshot may be substantially similar to snapshot 314. In an embodiment, the snapshot is synthesized by creating data pointers in a new file on the deduplicated storage. Additionally or alternatively, the pointers may be copied from the data journal. These pointers may point to the data referenced and/or contained in the journal. Synthesizing the snapshot using pointers may improve performance, as the data may not need to be replicated.

FIG. 5 depicts an additional or alternative embodiment for initializing a backup snapshot. The system shown in FIG. 5 may include data protection appliance 500, journal processor 502, and deduplicated storage 504. These elements may be substantially similar to those discussed in reference to FIG. 3.

Data protection appliance 500 may take a snapshot of a storage system and transmit that snapshot to deduplicated storage 504 for storage as a file. In an embodiment, this is different than streaming initialization IO's and synthesizing a snapshot from journal files. Rather than creating the snapshot on the deduplicated storage, the backup snapshot is created using the data protection appliance and transmitted to deduplicated storage to be stored as backup snapshot 514.

In an embodiment, journal processor 502 may stream application IO's to deduplicated storage, and those application IO's may be stored in metadata journal 506 and data journal 508. Like the journals of FIG. 3, metadata journal 506 may include metadata journal entries 510, and data journal 508 may include data journal entries 512. These journals may be used to synthesize a second backup snapshot or enable point-in-time recovery, as discussed below.

The systems and processes discussed in reference to FIG. 3, FIG. 4, and FIG. 5 enable a system to create an initial backup snapshot. Once the initial snapshot is created, additional processes may enable continuous data protection and point-in-time recovery. These processes will now be discussed.

Maintaining Backup Snapshots with Continuous Data Replication

Figure 6:
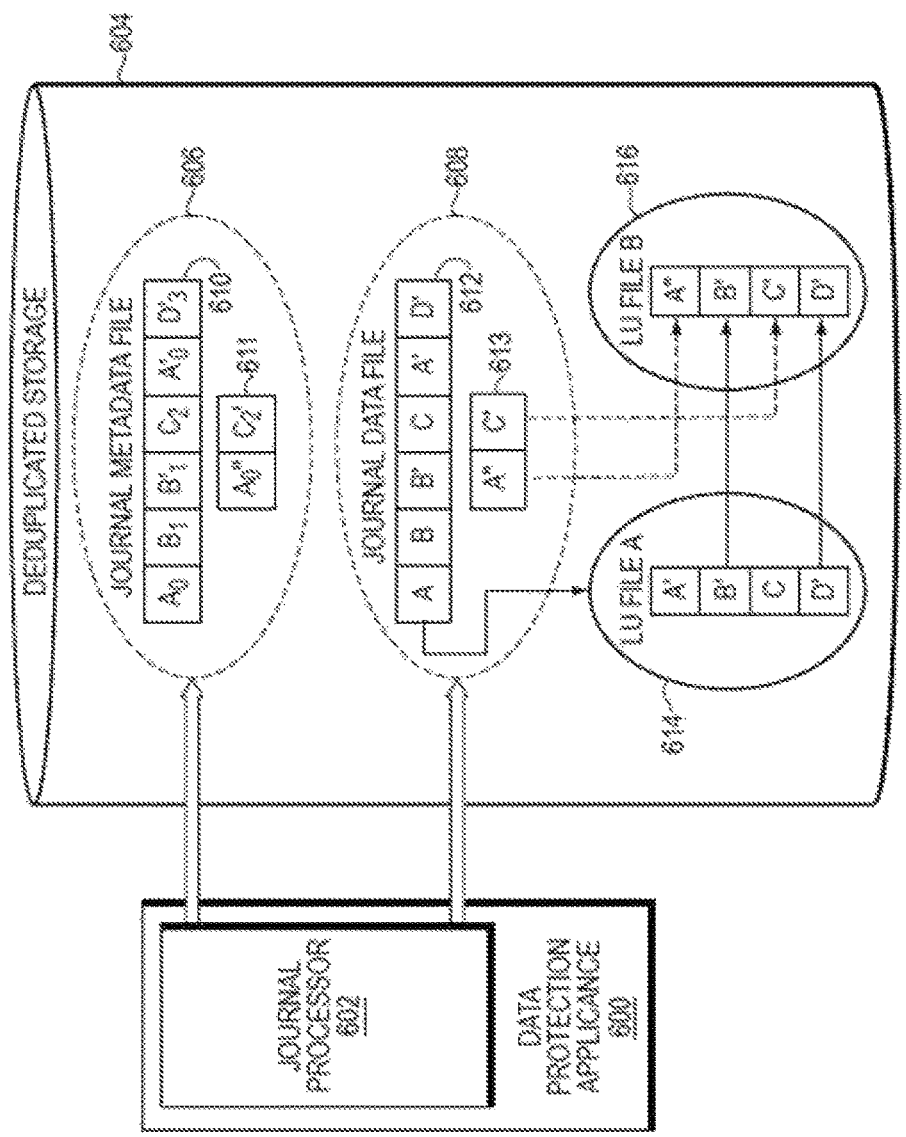
FIG. 6 is a system for synthesizing new backup snapshots, consistent with an embodiment of the present disclosure.

With reference now to FIG. 6, a system and process for maintaining backups using continuous data replication is discussed. As datasets increase in size, backing them up to remote or local backup devices becomes increasingly costly and complex. Additionally, traditional backup processes may not allow point-in-time recovery since the backups occur on a periodic, rather than continuous, basis. The methods and systems discussed herein provide continuous backup protection as writes are made to a source device, thereby reducing backup cost and complexity, and may allowing point-in-time recovery for backed up files.

The system of FIG. 6 includes data protection appliance 600, journal processor 602, and deduplicated storage 604. These elements may be substantially similar to those discussed in reference to FIG. 3. Deduplicated storage 604 may include backup snapshot 614, metadata journal file 606, and data journal file 608. In an embodiment, backup snapshot file 614 is synthesized in a manner substantially similar to backup snapshot 314, and may be created using metadata journal entries 610 and data journal entries 612.

As users, applications, and other processes access and use the source storage system, data on that system may change and/or new data may be created. As a result, initial backup snapshot 614 may become stale. If the source storage system should fail, there is a chance that any new or modified data may be lost. To address this concern, data protection appliance 600 may receive and stream application IO's to deduplicated storage system 604 on a continuous basis, even after initial backup snapshot 614 is synthesized. Streaming the application IO's allows the backups on deduplicated storage 604 to remain up-to-date, without needing to perform additional backups of large datasets. This may reduce network traffic, reduce workloads, and conserve space on deduplicated storage 604.

For example, new metadata entries 611 and new data journal entries 613 represent IO's made after initial backup snapshot 614 was synthesized. These entries may be written to metadata journal 606 and data journal 608, as shown in FIG. 6, or they may be written to separate journal files. In FIG. 6, data A' and C were modified on the source storage device, and the journal entries therefore comprise A" and C'.

Periodically, new backup snapshots may be synthesized from a previous backup snapshot and new journal entries. For example, second backup snapshot 616 may be synthesized from initial backup snapshot 614, new metadata journal entries 611, and new data journal entries 613. Second backup snapshot 616 may be used to restore source storage system up to the point-in-time the last journal entry was received. In other words, backup snapshot 616 represents a backup of the source storage system at a later timestamp than initial backup snapshot 614.

In an embodiment, synthesizing second backup journal entry 616 may be substantially similar to synthesizing the initial backup snapshot 614. Rather than synthesizing all of the data from data journal 608, however, unchanged data may be synthesized from initial backup snapshot 614. In an embodiment, this synthesis may comprise copying and/or creating a data pointer. For example, in FIG. 6 the solid arrows between initial backup snapshot 614 and second backup snapshot 616 represent unchanged data that is common between the two. In this case, only B' and D' remain unchanged. The dashed arrows represent new or changed data that needs to be synthesized into second backup snapshot 616. In FIG. 6, A' is changed to A", C is change to C'. Synthesizing the data into second backup snapshot 616 therefore results in A", B', C', D'.

Additionally or alternatively, second backup snapshot 616 may be synthesized entirely from journal entries. Rather than synthesizing unchanged data from initial backup 614, deduplicated storage 604 may retrieve the unchanged data from data journal entries 612. For example, B' and D' may be synthesized from data journal entries 612 rather than from initial backup snapshot 614.

Additional backup snapshots, such as second backup snapshot 616, may be created periodically or on demand. For example, a user policy may specify that new snapshots should be created every week. Additionally or alternatively, a user may be preparing to perform some risky operations on the source storage system, and may demand that a snapshot be created in case something goes wrong. These policies may be maintained and applied using data protection appliance 600, deduplicated storage 604, and/or an external system.

Figure 7:
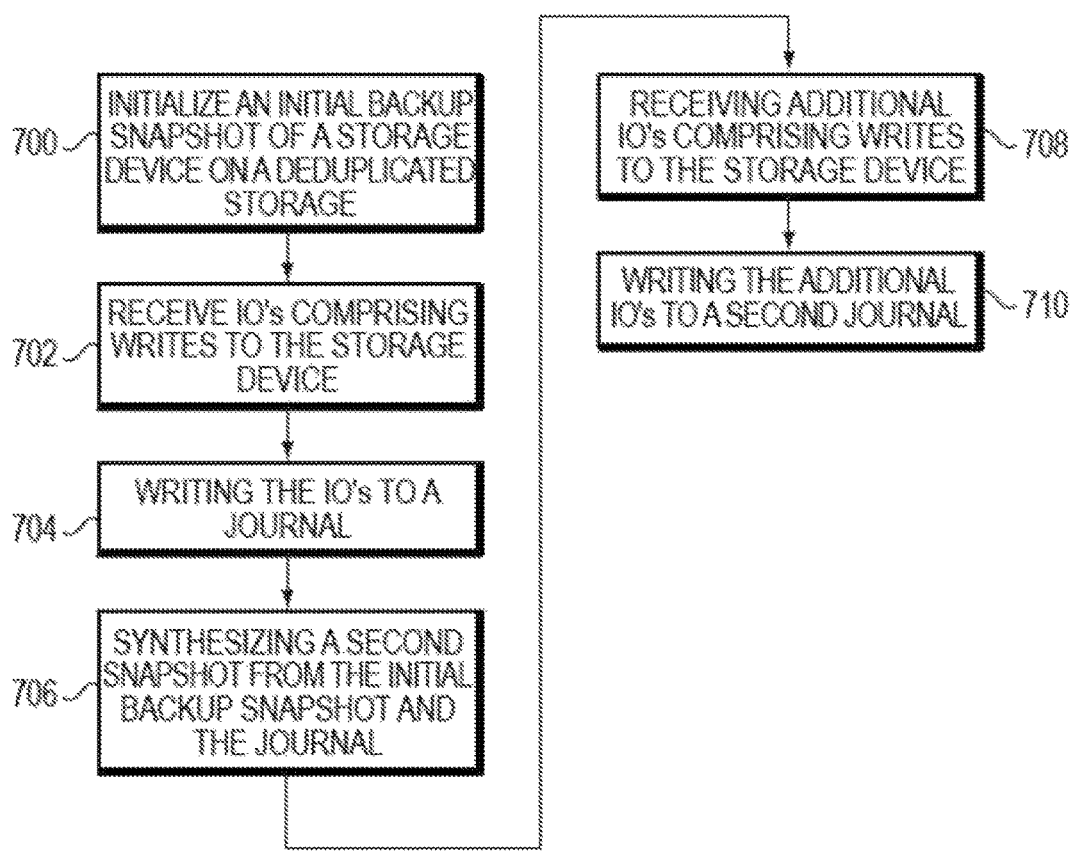
FIG. 7 is a flow chart for synthesizing new backup snapshots, consistent with an embodiment of the present disclosure.

Turning now to FIG. 7, a process for maintaining backup snapshots using continuous data replication is discussed. At block 700, an initial snapshot of a source storage system may be created. This initial snapshot may be substantially similar to initial backup snapshot 614, and may be created using the processes discussed in reference to FIG. 3, FIG. 4, and FIG. 5. Additionally or alternatively, the initial snapshot may be any previously created snapshot. For example, the initial snapshot may be similar to second backup snapshot 616, and may be used in conjunction with journal files to create a third backup snapshot.

At block 702, application IO's comprising writes to the source storage system may be received. These writes may update existing data or create new data. In an embodiment, the application IO's may be received by a data protection appliance, such as data protection appliance 600.

At 704, the application IO's may be written to a journal file. This journal file may be substantially similar to metadata journal file 606 and/or data journal file 608. In an embodiment, the application IO's may be written to one or more existing journals. Alternatively, application IO's arriving after a snapshot is synthesized may be written to their own unique journals. This may be beneficial, for example, when maintaining different levels of backup granularity, as discussed below.

In some embodiments, the application TO's are sequentially written to the journal as they are received. For example, if application TO's arrive in order B, C, A, their corresponding entries in the journal will also be B, C, A.

At block 706, a second snapshot may be synthesized from the initial backup snapshot and the journal. The second snapshot may be substantially similar to second backup snapshot 616, and the synthesis process may be similar to that depicted by the solid and dashed lines. In some embodiments, the second snapshot may be synthesized entirely from journal files rather than use the initial backup snapshot.

During and/or after the synthesis process, additional application IO's may be received at block 708. These application IO's could be used, for example, to create the third backup snapshot in the future, and may be processed in a manner similar to all the other application IO's discussed herein.

Finally, at block 710 the additional application IO's may be written to a journal file. They may be written to the same journal as the previous IO's, or they may be written to a new journal file.

Figure 7A:
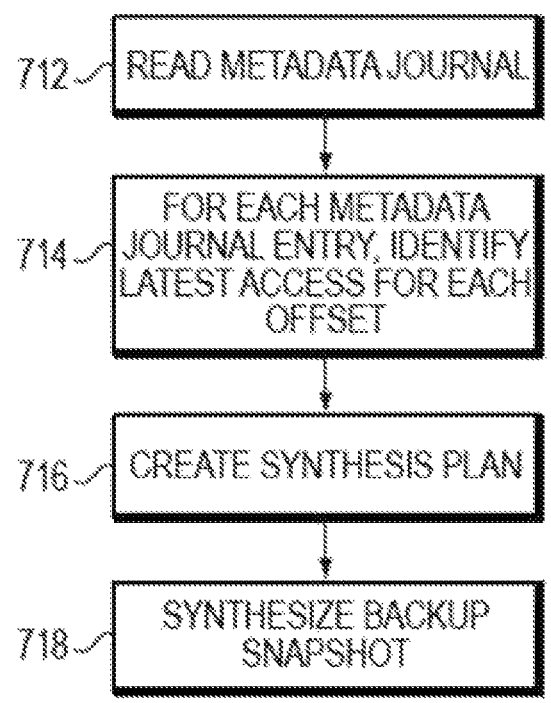
FIG. 7A is a flowchart for creating a synthesis plan consistent with an embodiment of the present disclosure.

FIG. 7A depicts a process for synthesizing snapshots used for continuous data replication. At block 712, a metadata journal may be read. This metadata journal could be, for example, metadata journal file 606. In an embodiment, the metadata journal may be read using a journal processor on a data protection appliance. Additionally or alternatively, the read operation may be local to the deduplicated storage device.

At block 714, the latest IO's for each offset may be identified. For example, metadata journal file 606 comprises journal entries 610 and 611. The latest entry for offset 0 is A", 1 is B', 2 is C', and 3 is D'. In some embodiments, journal entries 610 and 611 may be written to different journals. In such an embodiment, the only IO's identified would be A" and C' since we are synthesizing a snapshot from initial backup snapshot 614.

At 716, a synthesis plan may be created. This plan may identify where each IO should be synthesized from. For example, the synthesis plan may only identify A" and C' for synthesis from data journal 608. The B' and D', in contrast, may be obtained from initial backup snapshot 614 since they have not changed.

Finally, at block 718, the backup snapshot may be synthesized. This backup snapshot could be, for example, substantially similar to backup snapshot 616.

The system and processes discussed herein may enable additional backup snapshots to be synthesized from journal entries and existing snapshots. In some embodiments, the journal entries may be application IO's which are continuously streamed to a data protection appliance. While these snapshots may provide additional data protection, they may only allow data that exists in the snapshots to be recovered. Combining snapshots and journal files may, however, allow any point-in-time recovery.

Backup Point-In-Time Recovery from Deduplicated Storage

When datasets are backed-up on a periodic rather than continuous basis, data recovery may only be available for specific time intervals. For example, if a dataset is backed up at the end of every business day, the only data that is available for recovery is the data as it exists at the end of the day. Continuous backups, however, may allow recovery of data at any, or nearly any, point-in-time. By transmitting application IO's to a backup location as they occur, an interim snapshot may be synthesized between scheduled snapshots and data may be recovered.

Figure 8:
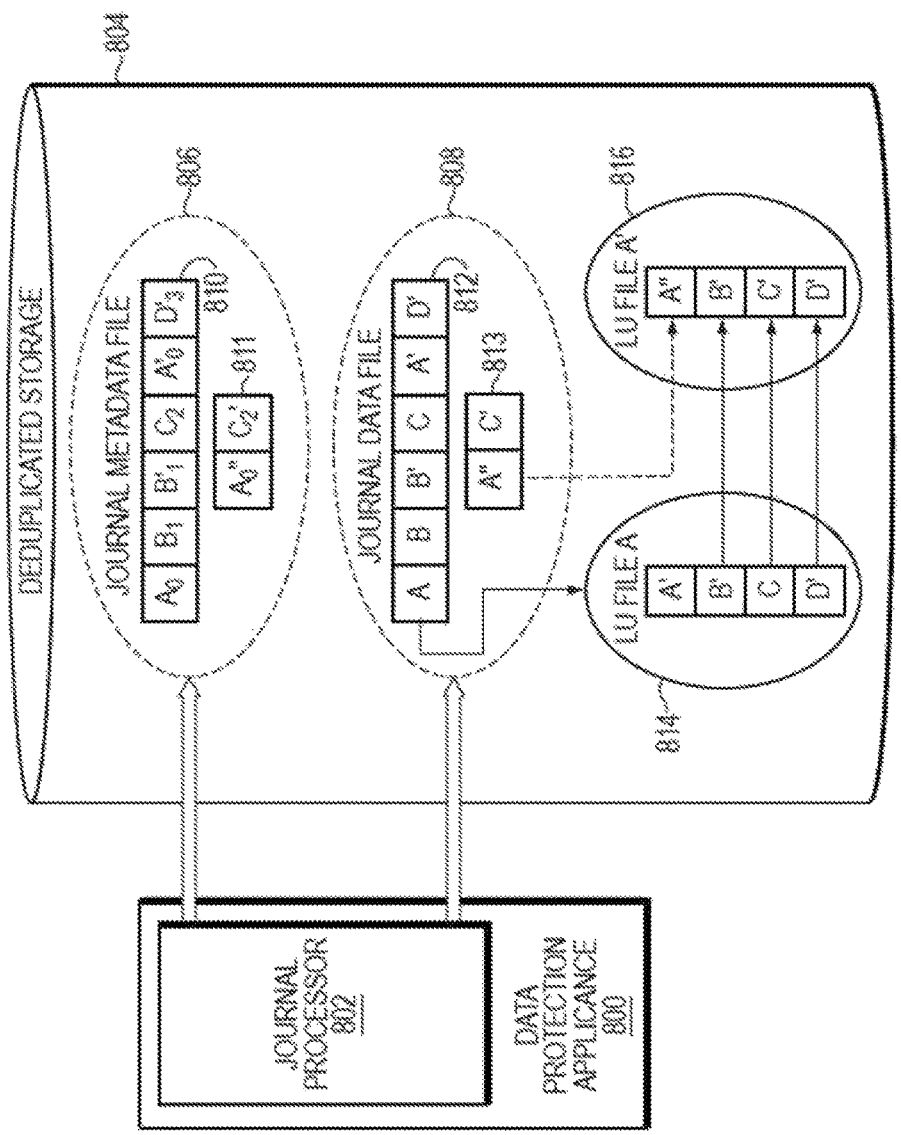
FIG. 8 is a system for point-in-time recovery, consistent with an embodiment of the present disclosure.
Figure 9:
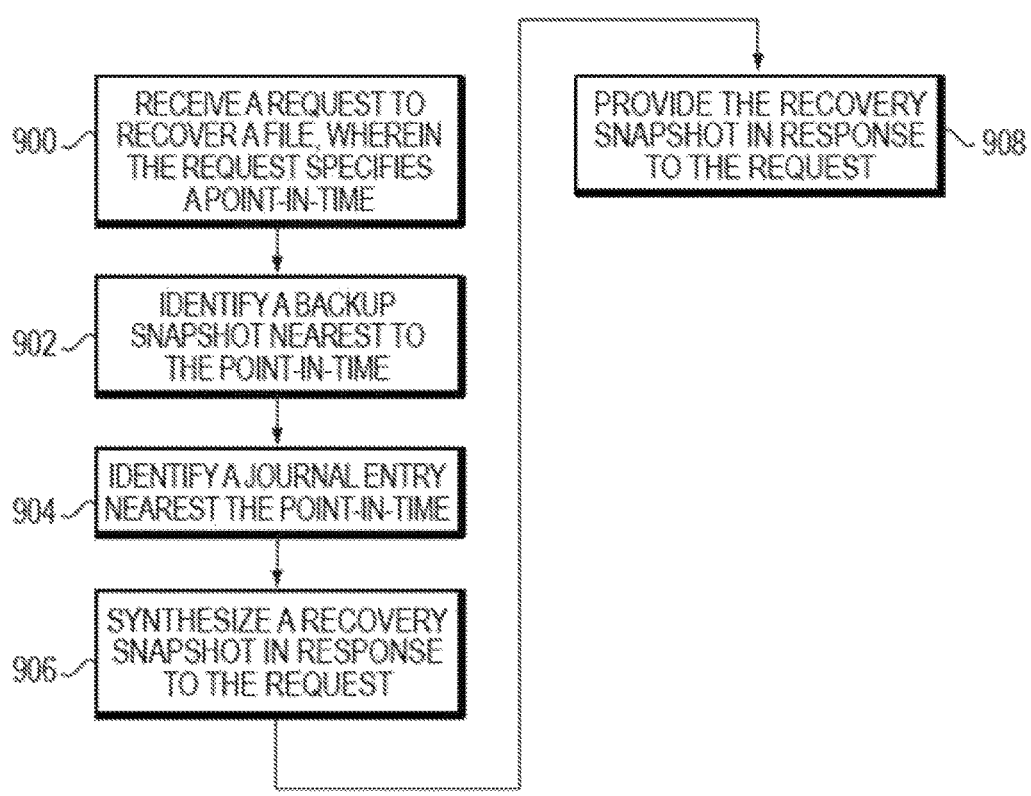
FIG. 9 is a flowchart for point-in-time recovery consistent with an embodiment of the present disclosure.

FIG. 8 and FIG. 9 depict a system and process for synthesizing an interim snapshot for point-in-time recovery. In an embodiment, the system may include data protection appliance 800, journal processor 802, and deduplicated storage 804. The system may also include metadata journal file 806, comprising metadata journal entries 810 and 811, and data journal file 808, comprising data journal entries 812 and 813.

Data protection appliance 800 may receive application IO's as they are made to a source storage system. In an embodiment, journal processor 802 may write those IO's to metadata journal file 806 and data journal file 808. Initialization journal entries 810 and 812 may be used to synthesize initial backup snapshot 814. Metadata entries 811 and data journal file entries 813 may be application IO's made to the source storage volume after or while initial backup snapshot 814 was synthesized. These elements may be substantially similar to those discussed in reference to FIG. 6.

In an embodiment, metadata journal entries 811 and data journal entries 813 may be used to synthesize interim snapshot 816. Interim snapshot 816 may then be used as a source for point-in-time recovery. For example, application IO's A" and C' may be streamed to deduplicated storage as they are made to the source storage system. A user may then decide they wish recover data from the point-in-time immediately after application IO A" was streamed. When the user's request arrives, the most recent snapshot may be initial backup snapshot 814, which does not contain A" or C'. To respond to the user's request, deduplicated storage 804 may synthesize interim snapshot 816. This snapshot may include unchanged data from initial backup snapshot 814, as shown by the solid black arrows, and application IO A" synthesized from data journal file 808, as shown by the dashed arrow. Note that interim snapshot 816 does not include C'. This is because the user requested data recovery at a point-in-time before C' may made.

In an embodiment, the data from interim snapshot 816 may be transmitted back to the source storage system and recovered. Additionally or alternatively, it may be exposed to a host as LUN, as discussed in reference to FIG. 12 and FIG. 13. Interim snapshot 816 may be deleted after recovery, or may be retained. In an embodiment, if interim snapshot 816 is created at a point-in-time sufficiently close to a scheduled synthesis time, the scheduled synthesis may be cancelled and interim snapshot 816 may be treated as second backup snapshot 616.

Turning now to FIG. 9, a flow chart depicting a process for point-in-time recovery is discussed. At block 900, a request to recover some data is received. This request could be, for example, received at data protection appliance 800 and/or deduplicated data storage 804. In an embodiment, the request may specify a file representing a LUN to recover, or it may be a request to recover an entire system. Additionally or alternatively, the request may specify a point-in-time for the recovery. The point-in-time may be a date, event, or any other mechanism to identify a specific time. In some embodiments, the point-in-time may be between snapshots.

At 902, a snapshot nearest the point-in-time may be identified. The snapshot could be, for example, initial backup snapshot 814.

At block 906, a recovery snapshot may be synthesized. This recovery snapshot could be, for example, substantially similar to interim snapshot 816. If the recovery snapshot is synthesized using a snapshot from an earlier point-in-time, IO's stored in a journal file may be applied to synthesize the recovery snapshot.

Finally, at block 908 the recovery snapshot may be provided in response to the request. For example, the recovery snapshot may be exposed as a LUN and mounted on a host computer, or exposed as a network file system share. Additionally or alternatively, the recovery snapshot may be transmitted back to the source storage system. In an embodiment, only a portion of the snapshot, such as a specific file, may be provided.

Combining backup snapshots, journals, and continuous data replication may provide point-in-time recovery capabilities. As more data is written to and/or modified on a source storage system, however, the number of journals and snapshots may increase. In some embodiments, data protection windows may be used to manage this data growth.

Maintaining Backup Granularity on Deduplicated Storage

As the number of snapshots and journals on the deduplicated storage grows, more space may be required. Deleting snapshots and journals may result in important information being lost, and adding to space to the deduplicated storage may be expensive. To address these concerns, backup windows and policies may be defined. Backup windows may be defined intervals designating which snapshot and journals should be stored, and for how long.

Figure 10:
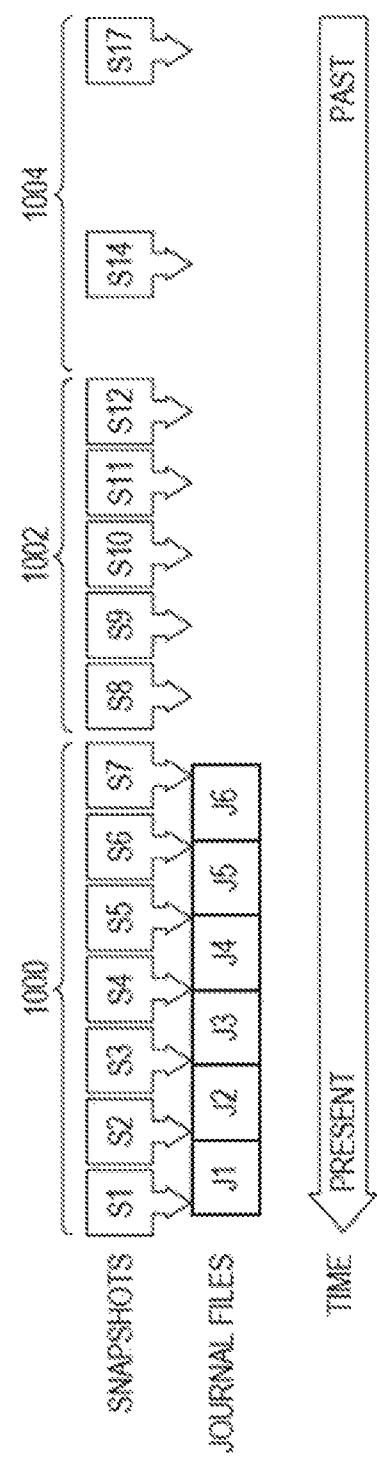
FIG. 10 depicts data protection windows providing backup granularity, consistent with an embodiment of the present disclosure.
Figure 11:
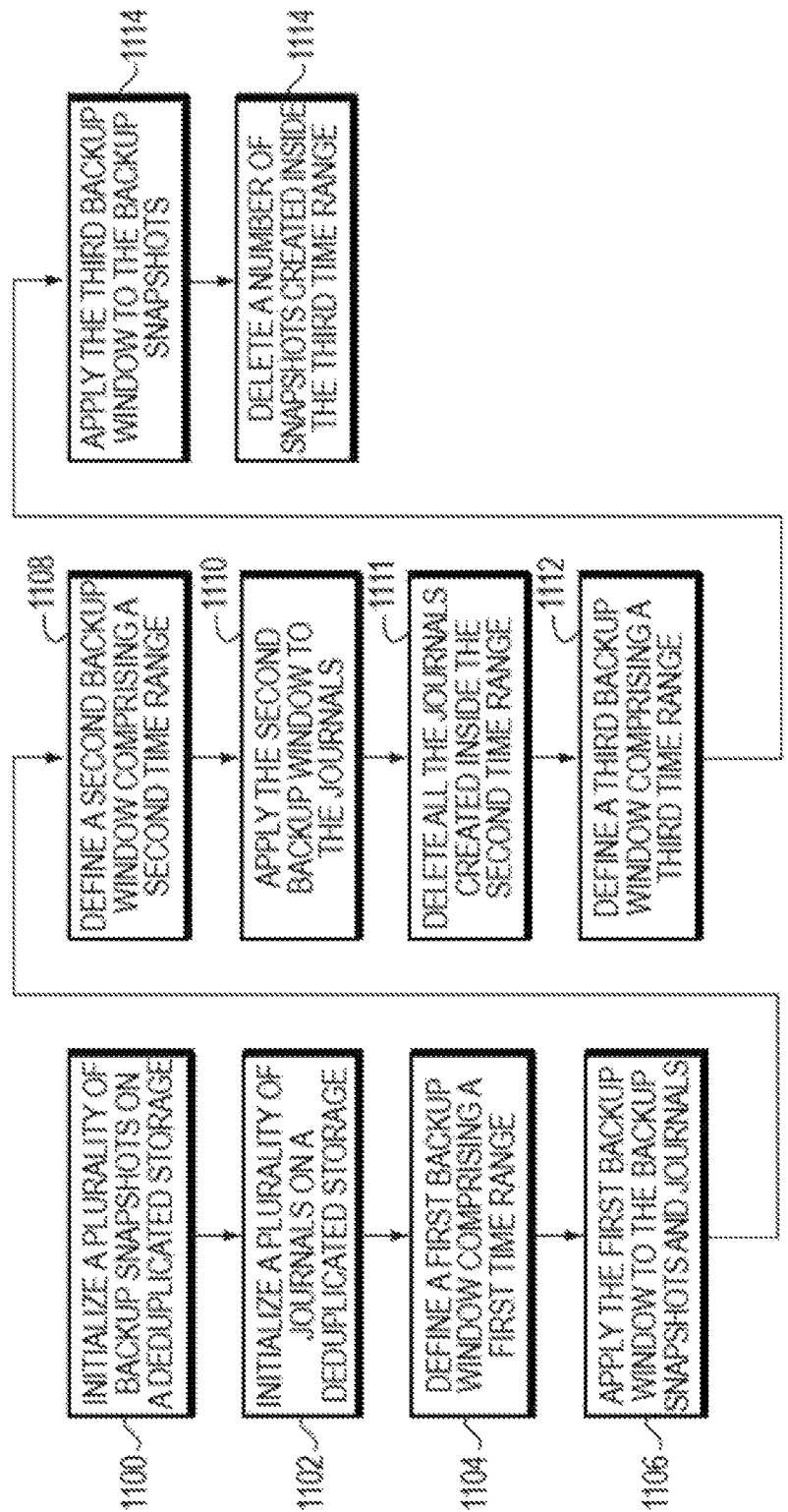
FIG. 11 depicts a flowchart for applying data protection windows, consistent with an embodiment of the present disclosure.

FIG. 10 and FIG. 11 depict a system and process for defining backup granularity using data protection windows. FIG. 10 shows seventeen snapshot files, labeled S1 through S17, stored on a deduplicated storage device. These snapshots may be created and maintained in a manner substantially similar to that discussed above. The deduplicated storage device may also include six journal files, labeled J1 through J6, which may be used to synthesize new snapshots or perform point-in-time recovery.

FIG. 10 also includes three data protection windows: short-term protection window 1000, mid-term protection window 1002, and long term protection window 1004. Each of these protection windows may have an associated policy specifying actions to take on any snapshot and/or journal file within the protection window. For example, one policy may be "delete all journals within this protection window." While the embodiments discussed herein address deletion and/or retention policies, any other policy which may be applied to the journals and/or snapshots is consistent with this disclosure.

Short-term protection window 1000 may be defined to protect both snapshots and journal files allowing for point-in-time recovery. This window may be particularly beneficial for snapshots that were created recently and/or were created on demand by a user. On demand creation may signify that the snapshot is more important than a scheduled snapshot because a user must go out of their way to create it. Further, it may be more likely that a user needs to recover data which was modified or created recently.

Mid-term protection window 1002 may include only snapshot files. As time progresses and journal files move from short-term protection window 1000 into mid-term protection window 1002, they may be deleted. While deleting journal files may prevent most point-in-time recovery, the snapshots may be maintained in mid-term protection window. As a result, some level of point-in-time recovery is preserved. Specifically, any data contained in one of the maintained snapshots may be recovered. Mid-term protection window therefore balances storage needs with recovery needs.

As snapshots move from mid-term protection 1002 window into long-term protection window 1004, certain snapshots may be deleted. Point-in-time recovery may be less important for long-term backups because of their age. The deleted snapshots may be chosen based on a policy, such as size or a user assigned priority. Additionally or alternatively, they may be arbitrarily chosen (for example, only retaining every fifth snapshot).

In an embodiment, data protection windows may be defined and maintained using a data protection appliance, a deduplicated storage device, and/or an external system. For example, if the data protection window is defined using a deduplicated storage device, that device may delete the journals and/or snapshots as the move from one data protection window into another. In some embodiments, the data protection windows may change dynamically based on available space on the deduplicated storage device. For example, if there is a large amount of available space the short-term protection window may be very large, and/or the mid-term and long-term protection windows may not exist. Similarly, if there is not much available space the long-term protection window may be very long.

Turning now to FIG. 11, a method for defining and applying data protection windows is discussed. At 1100, a plurality of backup snapshots may be initialized on a deduplicated storage. These snapshots may be initialized or created using any of the systems or methods discussed herein.

At 1102, a plurality of journals may be initialized on the deduplicated storage device. These journals may be created from application IO's received from source side storage, and may provide point-in-time recovery. In an embodiment, any of the processes discussed herein for creating and/or maintaining journals may be used.

At 1104, a first backup window comprising a first time range may be defined. The time range may specify the amount of time snapshots and/or journals remain inside the backup window. In an embodiment, the time range is dynamically based on the available storage on a deduplicated storage device.

At block 1106, the first backup window may be applied to the backup snapshots and journals. In an embodiment, the first backup window may be defined to maintain all of the snapshots and journals it covers. This may permit point-in-time recovery of data from those files. In an embodiment, the first backup window is substantially similar to the short-term backup window discussed above.

At block 1108, second backup window comprising a second time range may be defined. This second backup window may comprise a second time range similar to the first window's time range. In an embodiment, the second backup window only applies to journals, and may be substantially similar to mid-term backup widow 1002.

At 1110, the second backup window may be applied to the journals. This may occur as the journals move from the first backup window into the second backup window. For example, as time progresses the journal files may move outside the time range defined in the first protection window. This may be, for example, because the time range is shorter than the journals age. The journal may move into the time range specified in the second backup window, and that backup window may be applied.

At block 1111, as journals move into the second time range the may be deleted. In an embodiment, this may mean deleting every journal inside the second time range. Additionally or alternatively, only select journals may be deleted. For example, the data protection window may have an associated policy specifying that only every second journal should be deleted.

At 1112, a third backup window comprising a third time range may be defined. This third backup window may be substantially similar to long-term window discussed above. In an embodiment, the third time range may be a catch-all, meaning it applies to any journal and/or backup snapshot not covered by the first backup window or the second backup window.

At 1114, the third backup window may be applied to any remaining snapshots and/or journals. In an embodiment, the journals have all been deleted and the third backup window is only applied to snapshot files.

Finally, at block 1116, a number of snap shots inside the third time range may be deleted. The number of snapshots to delete may be based on a policy, such as only retain every tenth snapshot, in some embodiments only a daily snapshot may be kept, or any other policy may be applied (for instance keep ten daily snapshots and then ten weekly snapshots and then ten monthly snapshots, etc.).

The data protection windows discussed herein may provide varying degree of backup granularity. More recent and/or important information may include both snapshots and journal files, which longer term backups may only comprise periodic backup snapshots.

Providing Snapshot Access and Retrieval

Data backups are only useful if they can be accessed and/or retrieved when needed. Accessing backup snapshots may allow a user or system to retrieve data needed for recovery. For a system-wide recovery, the entire backup snapshot may be retrieved. In some embodiments, however, it may be beneficial to allow a user to access the snapshot directly to retrieve discrete pieces of data.

Figure 12:
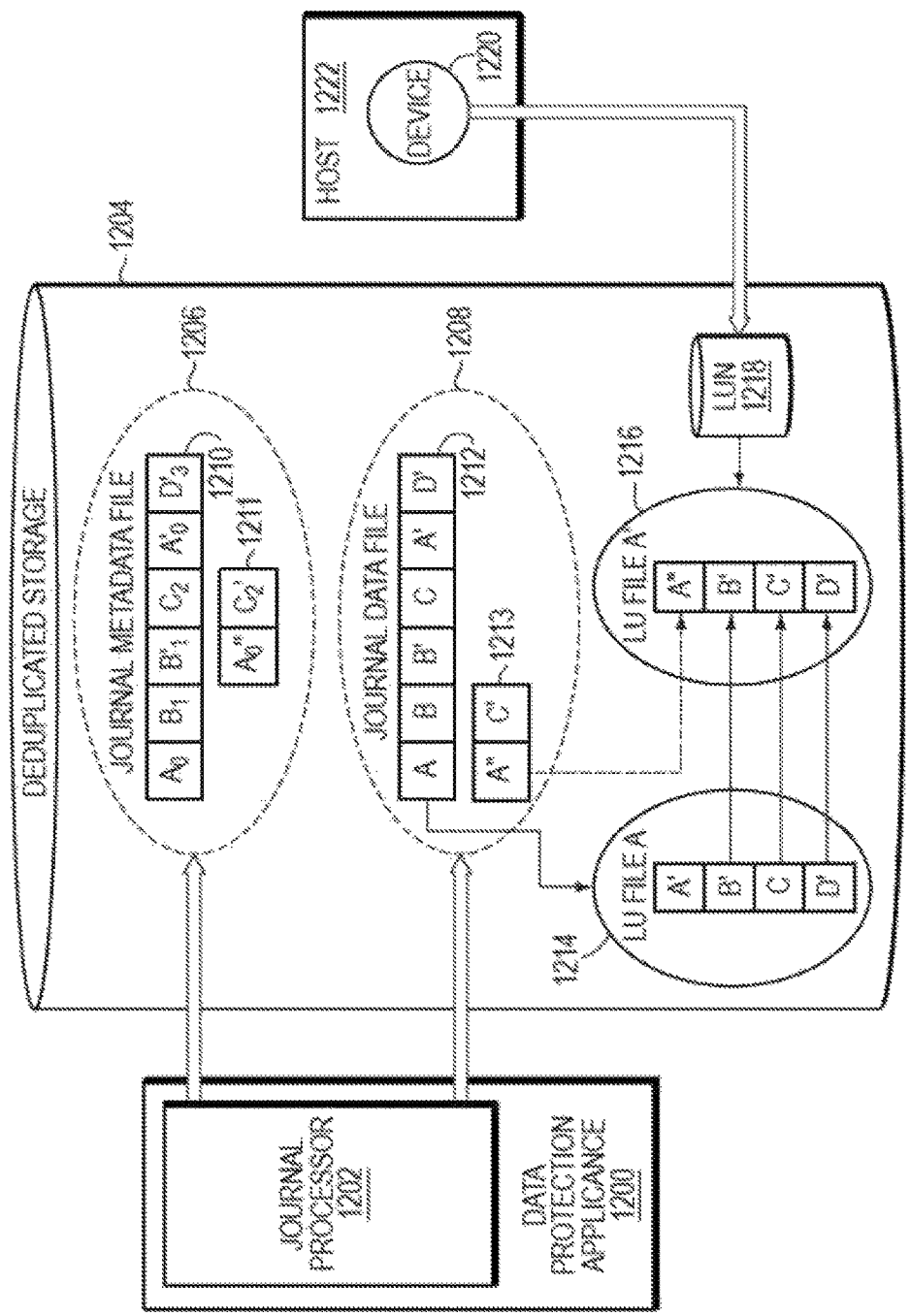
FIG. 12 depicts a system for mounting a recovery snapshot, consistent with an embodiment of the present disclosure.
Figure 13:
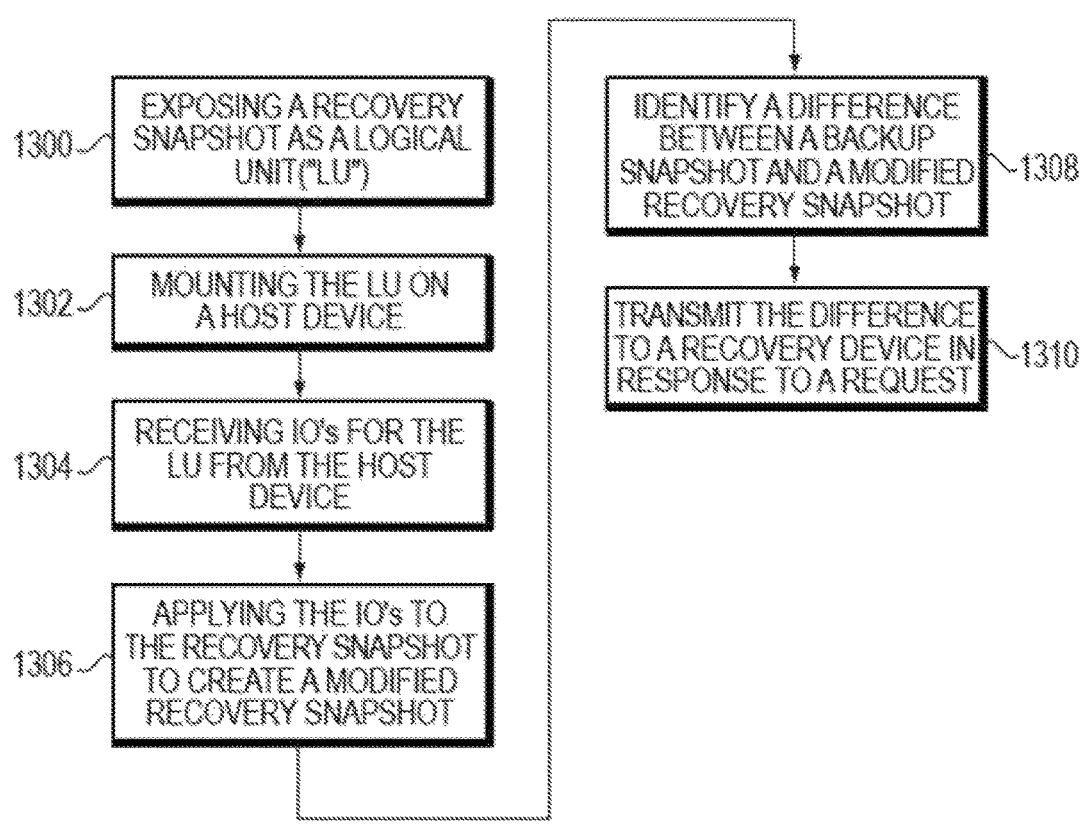
FIG. 13 depicts a flowchart for mounting a recovery snapshot, consistent with an embodiment of the present disclosure.

FIGS. 12 and 13 depict a system and process for providing access to data snapshots. The system of FIG. 12 may include data protection appliance 1200 comprising journal processor 1202, deduplicated storage 1204, and host 1222.

In an embodiment, deduplicated storage may comprise metadata journal 1206, data journal 1208, backup snapshot 1214, and recovery snapshot 1216. Recovery snapshot 1216 may be a synthesized snapshot for point-in-time recovery, as discussed in reference to FIG. 8. Metadata journal 1206 may include metadata journal entries 1210 and 1211, and data journal 1208 may include data journal entries 1212 and 1213. In an embodiment, these elements may be substantially similar to those discussed in reference to the figures above.

In some embodiments, a user may need to recover data from recovery snapshot 1216. Transmitting the entire snapshot over a network, however, may be inefficient given the snapshot's size. For example, if recovery snapshot is several gigabytes, and a user wishes to recover a file on the snapshot that is only a few megabytes, transferring the entire recovery snapshot 1216 may consume an unnecessary amount of network bandwidth.

Rather than transmitting recovery snapshot 1216 over a network, deduplicated storage 1204 may create block LUN 1218 on top of the snapshot. LUN 1218 may be exposed and mounted on host 1222 as device 1220. A user may access LUN 1218 through device 1220, and could thereby browse the snapshot for the data they wish to recover. Once the data is located, it may be transmitted to the source storage system directly, through data protection appliance 1200, or through host 1222.

In some embodiments, the source storage system may be down for a prolonged period of time, but a user may still need to access their data. In such an embodiment, the user may mount LUN 1218 as device 1220. Rather than merely recovering data, however, the user may make writes to the recovery snapshot 1216 through LUN 1218. The writes may be tracked, for example using metadata journal 1206 and data journal 1208. Once the source storage system is accessible again, a difference between the latest point in time of the volume at the storage array and the current data at recovery snapshot 1216 may be taken. The results of the difference may indicate which data has changed, and those changes may be communicated back to the source storage system. This may allow a user to continue to access and make changes to their data, even while the source storage system is down.

In an embodiment block LUN 1218 may not be created and mounted on host 1222. Instead, the recovery snapshot may be exposed as a network file system ("NFS") share. Host 1222 may accessed the NFS share, retrieve data, and/or perform write operations.

In some embodiments, recovery snapshot 1216 may comprise a virtual machine disk ("VMDK") file. The VMDK file may be, for example, accessed directly by an NFS mount and the virtual machine may boot using the VMDK file. Host 1222 may interact with the VMDK, and may make changes in the process. The VMDK may be transferred to the source side storage when it is available. In some embodiments, the transfer may occur while the VMDK is running.

Turning now to FIG. 13, a method for exposing a recovery snapshot as a logical unit is discussed. At 1300, a recovery snapshot may be exposed as a LUN. This exposure could occur, for example, by creating a block LUN on top of the snapshot. In some embodiments, the snapshot resides on a deduplicated storage, and the block LUN is created on that storage.

At 1302, the LUN may be mounted on a host device. Once mounted, the host device may access and interact with the LUN as if it were a local drive. For example, the host device may make read and/or write requests to the LUN.

At 1304, the deduplicated storage may receive IO's for the LUN from the host device. These IO's could be, for example, read and/or write requests.

At 1306, the IO's may be applied to the recovery snapshot to create a modified recovery snapshot. For example, the IO's could modify recovery snapshot 1216 to change data E to E'.

At block 1308, a difference between the modified recovery snapshot and a backup snapshot may be identified. This difference could be identified, for example, using API's native to the deduplicated storage device.

Finally, at block 1310, the difference may be transmitted to a recovery device. In some embodiments, the recovery device may be a source storage system. Additionally or alternatively, the difference may be transmitted in response to a request. For example, a user may access the system and request the difference between the modified recovery snapshot and a backup snapshot.

Recovering from Data Corruption

The systems and processes discussed herein may also be used to recover from data corruption. For example, a logically corrupt data source may be recovered using point-in-time synthesis processes. Similarly, corrupt virtual machine disks may be recovered and exposed to a user's virtual machine.

Figure 13A:
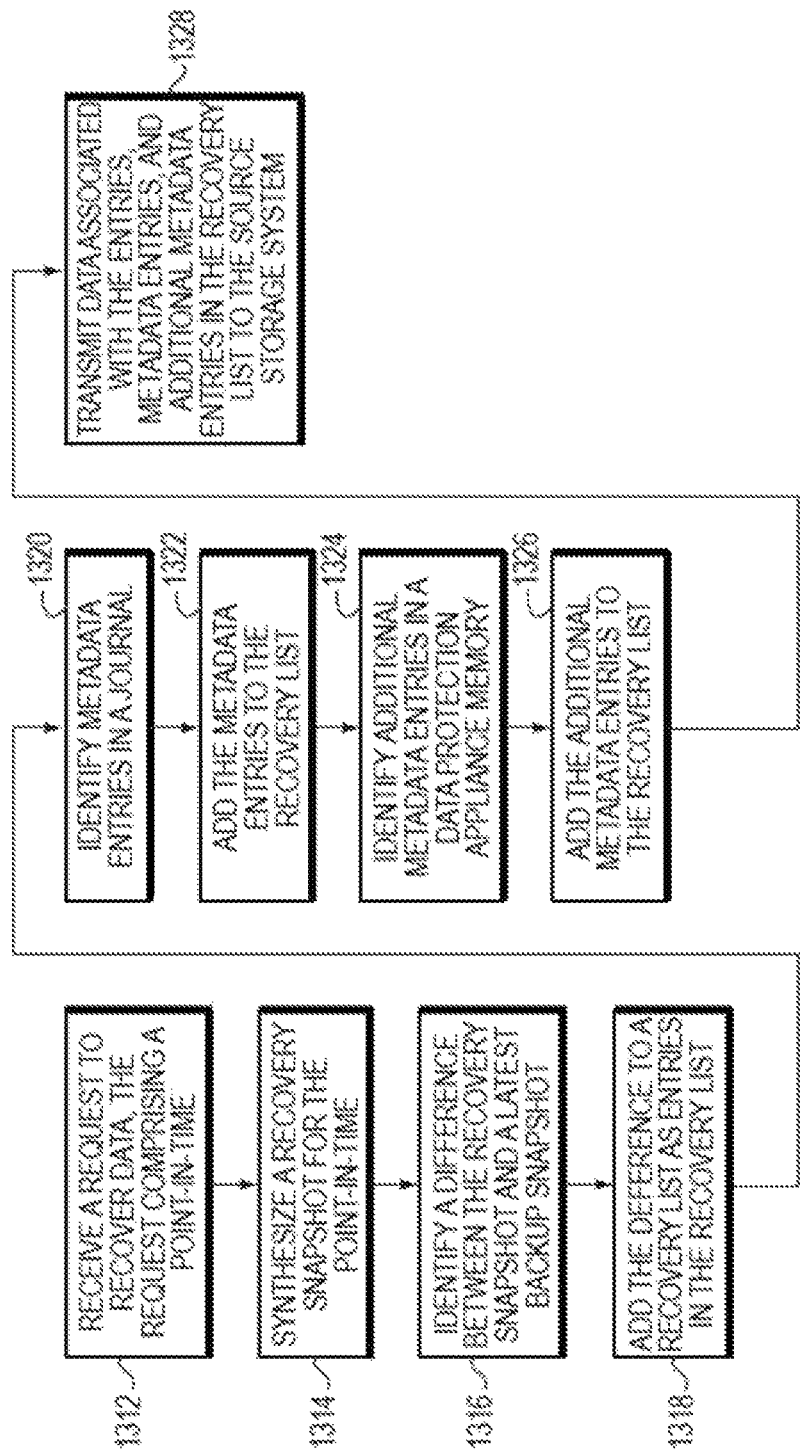
FIG. 13A depicts a flowchart for recovering data for a corrupt source data system consistent with an embodiment of the present disclosure.

Turning now to FIG. 13A, a method for recovering a logically corrupted source storage system is discussed. In an embodiment, a user may wish to recover the data on the corrupted system. The user may identify a point-in-time where the system is believed to not be corrupt, and synthesize a snapshot comprising data between that point-in-time and the latest point on the storage system. This snapshot may be applied to the system to recover the corrupt data.

At 1312, a request may be received from a user to recover data. The request may comprise a point-in-time identifying a time when the user believes the data was not corrupt. In an embodiment, the data between the point-in-time and the present time must be recovered because it is corrupt on the source storage system. Since the application IO's are made to the deduplicated storage in real time, however, the data on that location may be correct.

At 1314, a recovery snapshot may be synthesized for the point-in-time. This recovery snapshot could be, for example, synthesized in a manner substantially similar to the discussed above.

At 1316, a difference may be identified between the recovery snapshot and the latest backup snapshot. The latest backup snapshot may be a snapshot for a point-in-time later than the recover snapshot. For example, if the recovery snapshot comprises A, B, C, D, and E, and the latest backup snapshot comprises A', B, C', D, and E, the difference may be A' and C'. In an embodiment, the difference is identified on a deduplicated storage device and may use native APIs.

At 1318, the difference may be added to a recovery list as entries in that recovery list. In an embodiment, the entries may be metadata associated with the difference. For example, the recovery list may comprise metadata entries for A' and C'.

At block 1320, metadata entries in the latest journal file may be identified. The metadata entries may comprise metadata that is not included in the latest synthesized backup. For example, they may comprise application IO's that arrived after the latest backup snapshot was synthesized. This identification process could occur, for example, at a journal processor.

At block 1322, the metadata journal entries may be added to the recovery list. For example, if the entries comprise A" and D', the new recovery list may comprise A", C', and D'.

At block 1324, additional metadata entries may be identified in a data protection appliance memory. In an embodiment, these entries may be for application IO's which have arrived at the data protection appliance, but have not yet been transmitted and/or written to the journal file.

At 1326, the additional metadata entries may be added to the recovery list. For example, if the data protection appliance's memory includes B', the recovery list may comprise A", B', and D'.

Finally, at 1318 data associated with the metadata entries may be identified and transmitted back to the source storage system for recovery. If the metadata comprises pointers, for example, the data pointed to by the pointers may be transmitted back to the source storage system.

Figure 14:
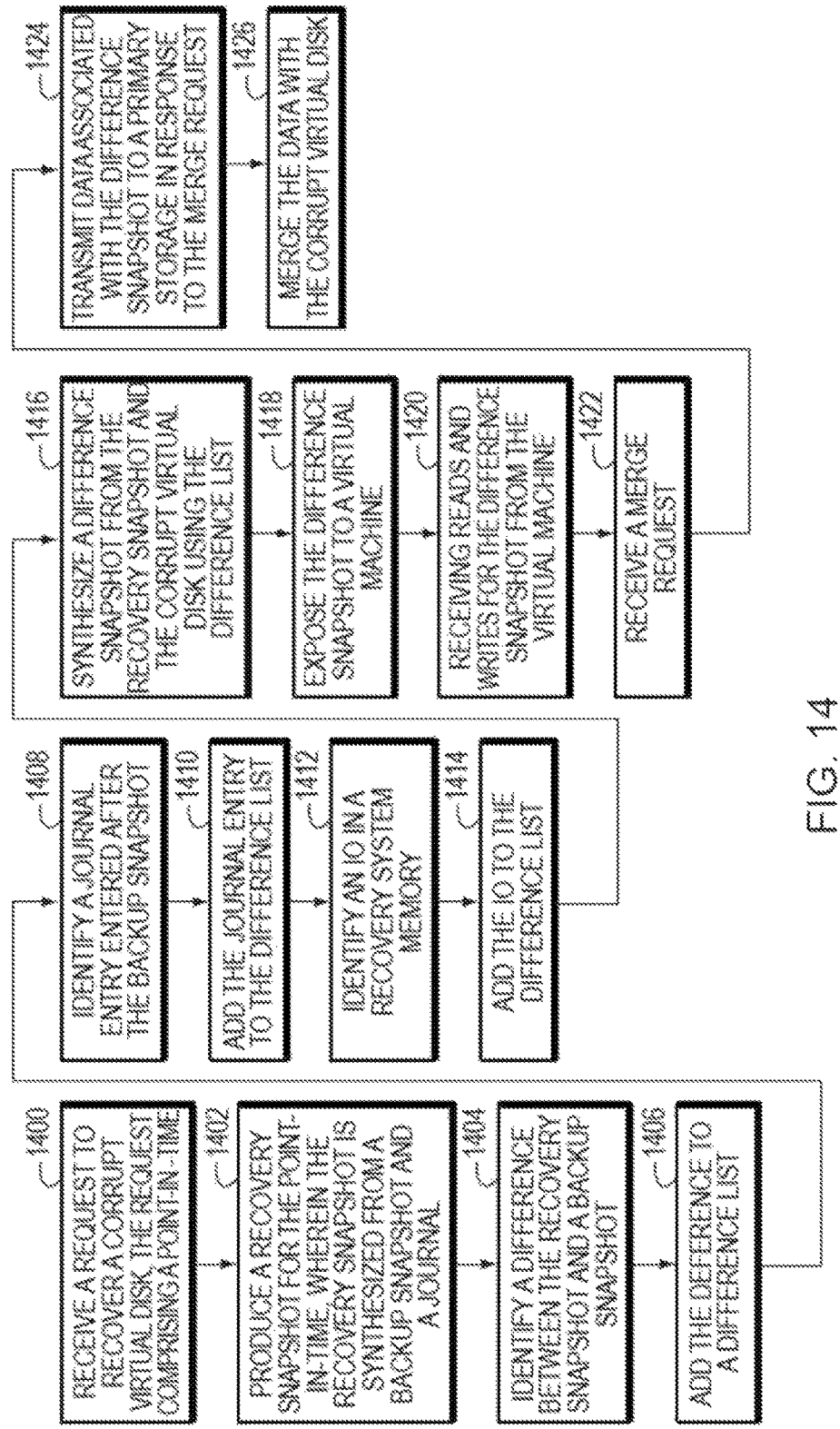
FIG. 14 depicts a flowchart for recovering a corrupt virtual machine consistent with an embodiment of the present disclosure.

With reference now to FIG. 14, a process for recovering corrupt virtual machine disks is discussed. These virtual machine disks may be, for example, VMDK files. Once recovered, a user may interact with both a primary VMDK file residing on primary storage and a difference VMDK residing on deduplicated storage. The user may also decide to merge the primary VMDK file and the difference VMDK file.

At step 1400, a request to recover a corrupt virtual machine disk may be received. This request may be received, for example, at a data protection appliance such as data protection appliance 1200. The request may include a point-in-time identifying a time when the virtual machine disk was not corrupt.

At 1402, a recovery snapshot for the point-in-time is produced. The recovery snapshot may be, for example, a synthesized snapshot of the virtual machine disk as it existed at the identified point-in-time. In some embodiments, the recovery snapshot is synthesized from a prior backup snapshot and a journal. This could be substantially similar to recovery snapshot 1216. Additionally or alternatively, a backup snapshot may already exist for the identified point-in-time, and the synthesis may therefore not be necessary. In such an embodiment, the recovery snapshot may be the backup snapshot, such as backup snapshot 1214. Once a recovery snapshot is produced, the system may identify differences between the recovery snapshot and the corrupt virtual disk. Data and/or metadata associated with the corrupt virtual disk may exist at three locations (excluding the primary storage). First, there may be data and/or metadata on the deduplicated storage in a backup snapshot (either a synthesized snapshot or an initial snapshot). Second, there may be data and/or metadata in the journal files. Finally, there may be data and/or metadata in the data protection appliance that has not been transmitted to the deduplicated storage.

At block 1404, a difference between the recovery snapshot and a later backup snapshot is identified. This later backup snapshot may comprise data from the corrupt virtual disk, and will be used to identify differences between the corrupt virtual disk and the recovery snapshot. In an embodiment, the later backup snapshot may be the latest backup snapshot. Additionally or alternatively, it may be the backup snapshot created or synthesized at a point-in-time closest to the present, or closest to the earliest corruption time of the virtual disk.

At block 1406, the difference may be added to a difference list. The difference and difference list may comprise pointers to the changed data. This may allow the list to be compiled quickly without moving data on the deduplicated storage system.

At block 1408, journal entries received and entered after the later backup snapshot was synthesized are identified. For example, the journal entries may comprise IOs which have not yet been synthesized into a backup snapshot. In an embodiment, the journal entries are metadata journal entries, such as metadata journal entries 1210 and 1211, and may comprise pointers to the changed data. Once identified, the journal entries may be added to the difference list at block 1410.

At block 1412, IOs residing in a data protection system memory may be identified. The recovery system could be, for example, a data protection appliance, such as data protection appliance 1200. The identified IOs may comprise changes made to the corrupt virtual disk on the primary storage that have not yet been processed and transmitted to the deduplicated storage. In an embodiment, they may be identified using a journal processor.

Once the IOs are identified, they may be added to the difference list at block 1414. In some embodiments, the difference list may only comprise metadata. For example, at block 1414 the IO metadata may be added to difference list. This metadata could be, for example, similar to the metadata stored in metadata journal 1206 (or any other metadata journal discussed herein). Additionally or alternatively, the difference list may comprise data or a combination of both data and metadata.

In some embodiments, all the IOs in the data protection system may be flushed to the deduplicated storage prior to identifying entries in the journal. In such an embodiment, it may not be necessary to check the data protection system for received IOs as they all reside in the journal.

At block 1416, a difference snapshot is synthesized from the difference list. The difference snapshot may comprise the data that is different between the corrupt virtual machine disk and the recovery snapshot. In some embodiments, this difference snapshot may comprise pointers to the data residing on the deduplicated storage system.

The difference snapshot may be exposed to a virtual machine at block 1418. In some embodiments, the virtual machine may operate a user system, such as host 1222. The virtual machine may be reconfigured to point to both the difference snapshot and the corrupted disk. This reconfiguration could be performed, for example, through a hypervisor or other virtual machine management tool. Since the virtual machine is in communication with both the primary virtual disk and the difference virtual disk (i.e. the difference snapshot), the virtual machine may operate as though it is in communication with a single, uncorrupted virtual disk.

For example, at block 1420 reads and writes may be received from the virtual machine. If the virtual machine makes a write, it will go to the difference file on deduplicated storage. This allows changes to be made to the difference file rather than the corrupt virtual machine disk. If the virtual machine makes a read, it may read from the primary (corrupt) virtual disk or the difference snapshot, depending on where the data resides. Specifically, if the data is resides in an uncorrupt portion of the primary virtual disk, it will be read from the primary virtual machine disk. If the data resides in a corrupt portion of the virtual machine disk, or if the data was recently written to the difference file, the data may be read from the difference file on the deduplicated storage.

At block 1422, a merge request may be received. This merge request could come from a hypervisor managing the virtual machine and/or a user who would like to restore the corrupt virtual disk to an uncorrupt state. In an embodiment, the merge request is a command to merge the difference file on the deduplicated storage with the corrupt primary virtual disk on the primary storage.

At block 1424, data associated with the difference snapshot may be transmitted to the primary storage. If the difference snapshot comprises pointers to data, for example, that data may be read from the deduplicated storage and transmitted to the primary storage.

Finally, at block 1426 the data may be merged with the corrupt virtual disk on the primary storage system. This may result in a fully restored, operational, and/or uncorrupted virtual machine disk.

The merge processes discussed in blocks 1422-1426 may be managed using a hypervisor or other virtual machine management tool. The hypervisor may both send the merge request and use internal functionality to manage the merge process. Once the merge is complete, the hypervisor may direct the virtual machine to the restored virtual machine disk file, and the difference snapshot on the deduplicated storage system may be deleted.

Efficient Production Recovery

Traditionally, a deduplicated storage and/or data protection appliance provides the ability to perform production recovery. Typically, a deduplicated storage and/or data protection appliance is needed when the primary data is corrupted due to an event, such as a malicious event or an non-intended event. For example, conventionally, a deduplication storage and/or data protection appliance can protect from an accidental deletion of a table from a database or a virus attack that corrupts files. Usually, a deduplicated storage and/or data protection appliance allows the user to choose a point in time (PiT) that is earlier than the corrupted event which is present in the appliance's system and restore this PiT back to the primary storage recovering the data to a non-corrupt state. Generally, data recovery is accomplished by synchronizing only areas of the storage that were changed between the current state and the recovered PiT. Traditionally, it is assumed that a user can first validate that the recovered PiT selected does not exhibit the issue that caused the corruption, however, in some cases, accessing the image on the replica storage can be cumbersome and/or may not be possible due to performance restrictions. Conventionally, the data storage industry would benefit from being able to access and/or operate on a snapshot without affecting the primary data storage.

In many embodiments, the current disclosure may enable a deduplicated storage and/or data protection appliance to provide a user with the ability to utilize a snapshot of a production Logical Unit (LU) on primary data storage without affecting the production LU. In various embodiments, the current disclosure may enable a deduplicated storage and/or data protection appliance to provide a restore-to-snap capability. In some embodiments, a restore-to-snap capability may enable a deduplicated storage and/or data protection appliance to restore a production data storage system to a Point in Time (PiT) from a snapshot of the production data storage system. In other embodiments, a deduplicated storage and/or data protection appliance may be enabled to perform production recovery on a snapshot of a production data storage system. In most embodiments, a deduplicated storage and/or data protection appliance may be enabled to update a production data storage system from a recovered snapshot.

In many embodiments, a restore-to-snap capability may be used for one or more other situations, such as a test-and-development situation where a replica of an image of the primary data storage may be efficiently created by performing restore-to-snap from a local copy of the data. In various embodiments, a restore-to-snap capability may enable ad-hoc snapshot creation, where instead of creating array snapshots in pre-determined PiTs, the data storage appliance Journal may be used for any PiT tracking. In certain embodiments, using a restore-to-snap capability, a user may be enabled to create a snapshot of the primary data storage at any PiT during the operation of the primary data storage. In most embodiments, a restore-to-snap capability may enable a user to continue to work on a production device and replicate into the backup device (e.g., EMC Data Domain device), while the data is being restored to the snapshot and may enable the user to test the new snapshot while the production devices is still running.

In many embodiments, a Data Protection Appliance may be enabled to direct a deduplicated storage to restore a point in time. In various embodiments, a Data Protection Appliance may be enabled to perform production recovery where the target of the recovered data may be the snapshot created, rather than the actual production LU. In some embodiments, restore-to-snap may be as efficient as regular production recovery as the snapshot may be a frozen image of the production LU, which may enable host nodes accessing the production LU to continue working while recovery may be taking place on the snapshot. In most embodiments, recovery to a snapshot may enable a user and/or administrator to test changes to production data on the snapshot before the production data may be implemented to the live production LU. In various embodiments, recovery to a snapshot may enable a user and/or administrator to develop and test using production data without affecting availability and/or current use of the production LU.

Figure 15:
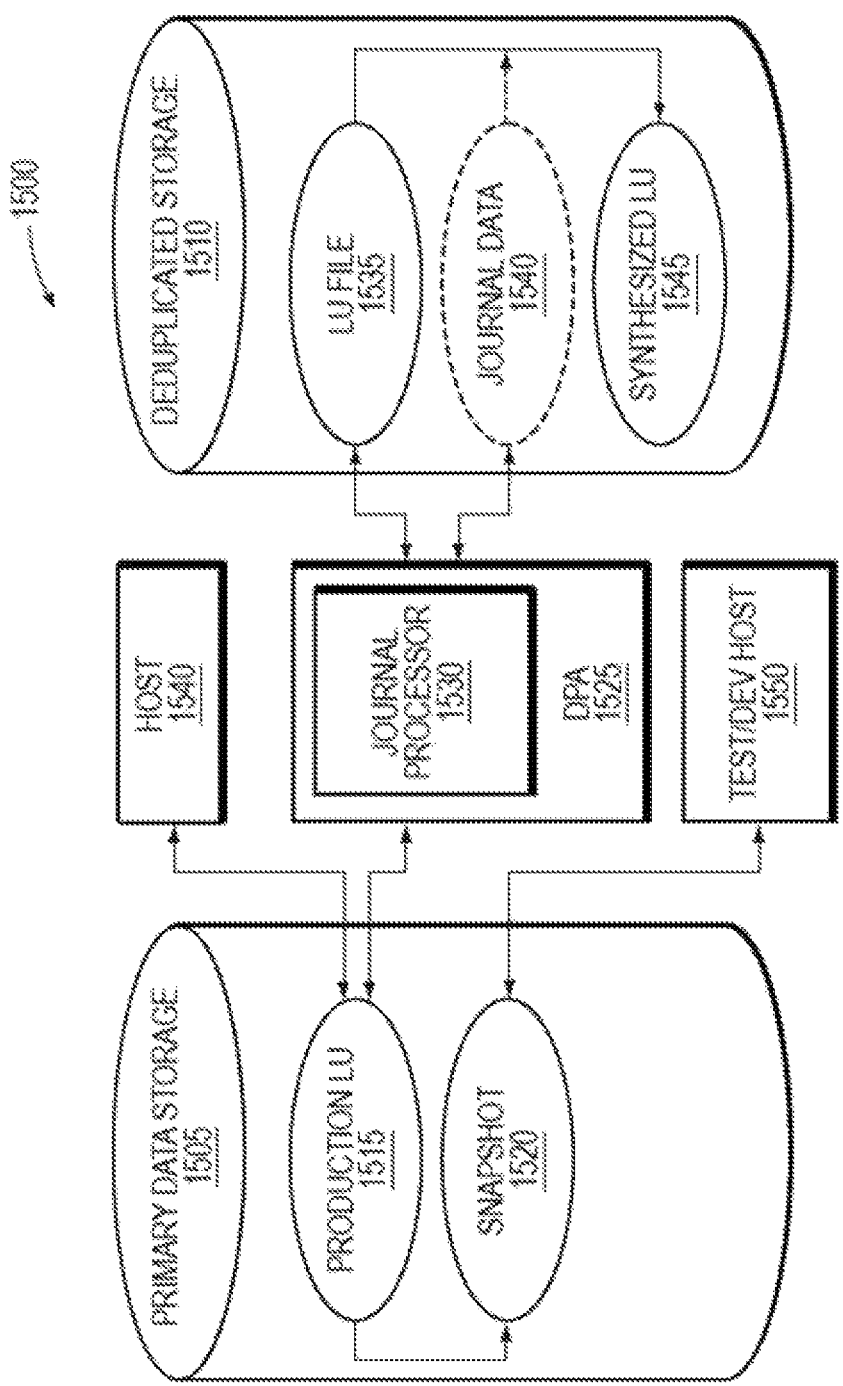
FIG. 15 is a simplified illustration of a Data Protection Appliance in communication with a primary data storage and a deduplicated backup storage, in accordance with an embodiment of the present disclosure.

Refer to the example embodiment of FIG. 15. FIG. 15 is a simplified illustration of a Data Protection Appliance in communication with a primary data storage and a deduplicated backup storage, in accordance with an embodiment of the present disclosure. System 1500 includes Primary Data Storage 1505, Data Protection Appliance 1525, Deduplicated backup Storage 1510, host 1540, and Test/Dev Host 1550. Data Protection Appliance (DPA) 1505 includes journal processor 1510. Deduplicated backup storage 1510 includes LU File 1535, Journal Data file 1540, and Synthesized LU file 1545. Primary Data Storage 1505 includes production LU 1515 and Snapshot 1520. Journal Data 1540 is comprised of a journal metadata file and a journal data file and operates on deduplicated storage 1510 as described in FIG. 8. Host Node 1540 is in communication with primary data storage 1505. Host node is actively accessing Production LU 1515. In this embodiment, DPA 1525 is enabled to create snapshot 1520 from production LU 1515. DPA 1505 is enabled to create synthesized LU file 1545 from LU File 1535 and Journal Data 1540, where synthesized LU file has the same data as the Production LU at a specified Point in Time (PiT). Journal Processor 1530 within DPA 1525 is enabled to determine differences between Synthesized LU 1545 and snapshot 1520 and transfer the differences from deduplicated storage 15010 to primary data storage 1505. DPA 1525 is enabled to perform a recovery to a specified PiT on snapshost 1520 using the differences transferred from deduplicated backup storage 1510. DPA 1525 is enabled to perform recovery on snapshost 1520 without affecting the use of production LU 1515 by host node 1540. In many embodiments, a DPA may be enabled to expose a snapshot on the primary storage array as a Logical Unit (LU) which may be enabled to be accessed by one or more nodes for the purposes of development and/or testing on the snapshot. In various embodiments, testing on a snapshot of the production LU may enable analysis of data approximating the production LU without affecting the production LU and/or affecting any hosts actively accessing the production LU.

Figure 16:
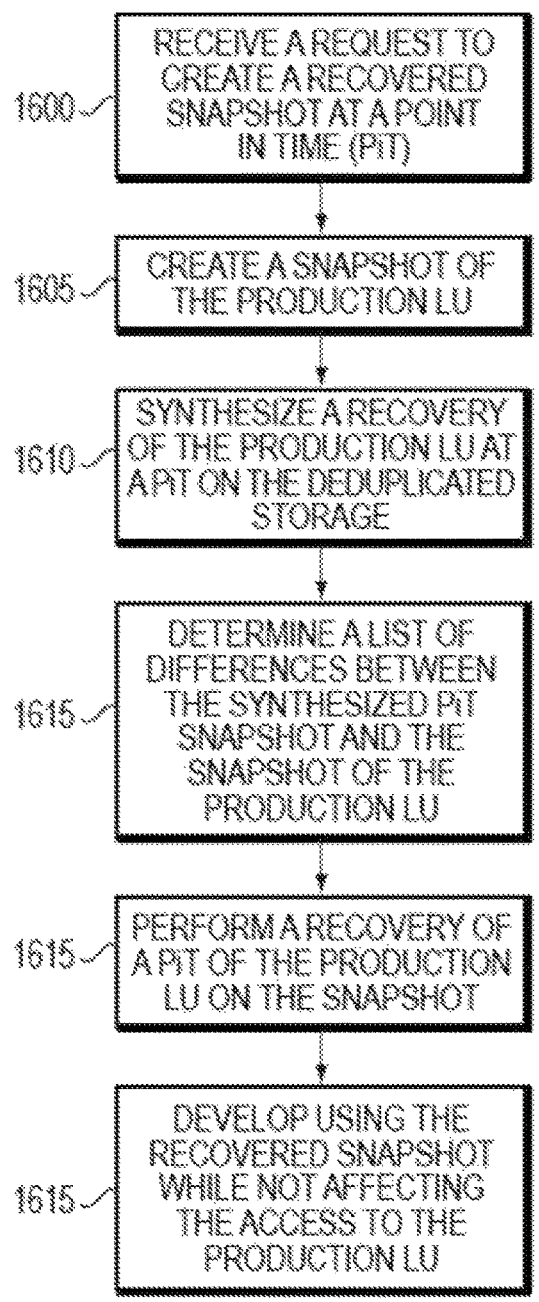
FIG. 16 is a simplified flowchart of a method of developing using production data in a system as shown in FIG. 15, in accordance with an embodiment of the present disclosure.

Refer to the example embodiment of FIGS. 15 and 16. FIG. 16 is a simplified flowchart of a method of developing using production data in a system as shown in FIG. 15, in accordance with an embodiment of the present disclosure. In FIG. 15, System 1500 includes Primary Data Storage 1505, Data Protection Appliance 1525, Deduplicated backup Storage 1510, host 1540, and Test/Dev Host 1550. DPA 1525 receives a request to create a recovered snapshot at a specified Point in Time (PiT) based on production LU 1515 (Step 1600). DPA 1505 communicates with primary data storage 1505 and creates snapshost 1520 based on production LU 1515 (Step 1605). DPA 1525 communicates with deduplicated backup storage 1510 to synthesize the required recovery point in time on deduplicated backup storage 1510 (Step 1610) which creates synthesized LU 1545. The synthesizing of a recovery point in time is described in FIG. 8. DPA 1525 determines a list of differences between synthesized LU 1545 and snapshot 1520 (Step 1615). The determining of the differences are described in FIG. 13. DPA 1525 performs a recovery of a PiT of Production LU 1515 on snapshot 1520 (Step 1620), thereby enabling snapshost 1520 to be a copy of Production LU 1515 at the time specified. DPA 1525 performs the recovery by copying data for the locations in the meta data list created in step 1610 from synthesized LU 1545 to snapshot 1520. In this embodiments, DPA 1505 directs primary data storage 1505 to expose snapshot 1520 as a Logical Unit which accessible to Dev/Test node 1550. Dev/Test node 1550 is enabled to develop and/or test using snapshot 1520 without affecting production LU 1515 on deduplicated storage 1510 (Step 1625).

Figure 17:
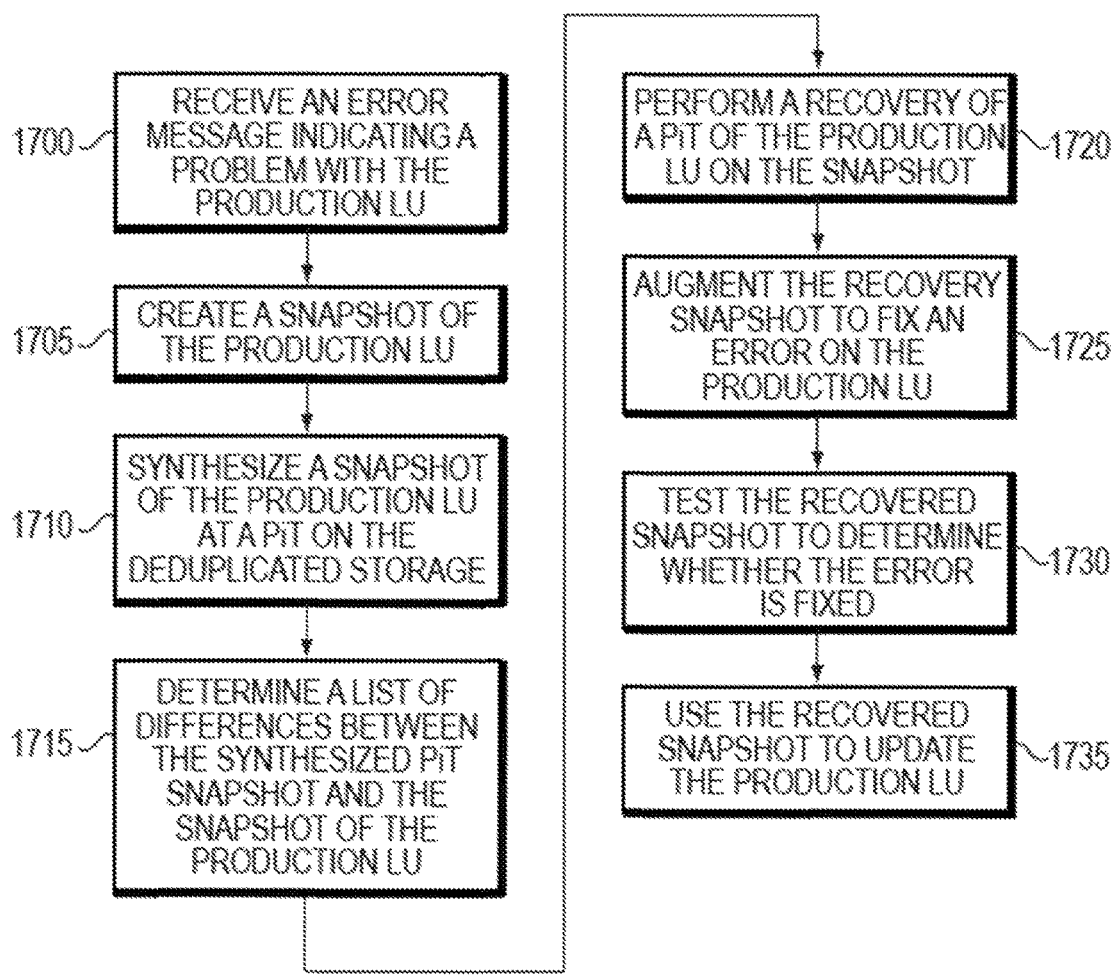
FIG. 17 is a simplified flowchart of a method of efficiently testing using production data, in accordance with an embodiment of the present disclosure.

Refer to the example embodiments of FIGS. 15 and 17. FIG. 17 is a simplified flowchart of a method of efficiently testing using production data, in accordance with an embodiment of the present disclosure. In FIG. 15, System 1500 includes Primary Data Storage 1505, Data Protection Appliance (DPA) 1525, Deduplicated backup Storage 1510, host 1540, and Test/Dev Host 1550. DPA 1525 receives a message that production LU 1515 contains an error (Step 1700). In many embodiments, a data storage array containing a production LU may be enabled to determine whether an error exists and/or has occurred within the production LU. In various embodiments, a host may be enabled to determine whether an error exists and/or has occurred with the production LU. In certain embodiments, either a host node and/or data storage array may be enabled to communicate the error to an associate Data Protection Appliance to resolve the error within the production LU.

DPA 1525 communicates with primary data storage 1505 and creates snapshost 1520 based on production LU 1515 (Step 1705). DPA 1525 communicates with deduplicated storage 1510 to synthesize the required recovery point in time on deduplicated backup storage 1510 (Step 1710) which creates synthesized LU 1545. DPA 1525 determines a list of differences between synthesized LU 1545 and snapshot 1520 (Step 1715). DPA 1525 performs a recovery of a PiT of Production LU 1515 on snapshot 1520 (Step 1720), thereby enabling snapshot 1520 to be a copy of Production LU 1515 at the time specified. Production Data Storage 1505 is enabled to expose snapshot 1520 for testing to verify that the error detected in production LU 1515 does not exist in snapshot 1520. Snapshot 1520 is augmented by test/dev host 1550 to fix the error reported on production LU 1515 (Step 1725). Test/Dev host 1550 tests snapshot 1520 to determine whether the error is fixed. Upon determination that the error is fixed, DPA 1525 uses snapshot 1520 perform an update and/or recovery on Production LU 1515 (Step 1735). If the error still exists in snapshot 1520, snapshot 1520 can be further augmented to the fix the error detected on production LU 1515. In many embodiments, an error may be fixed by recovering a snapshot to an earlier point in time. In various embodiments, an error may be fixed by modifying the offending portion of data within the snapshot.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 18:
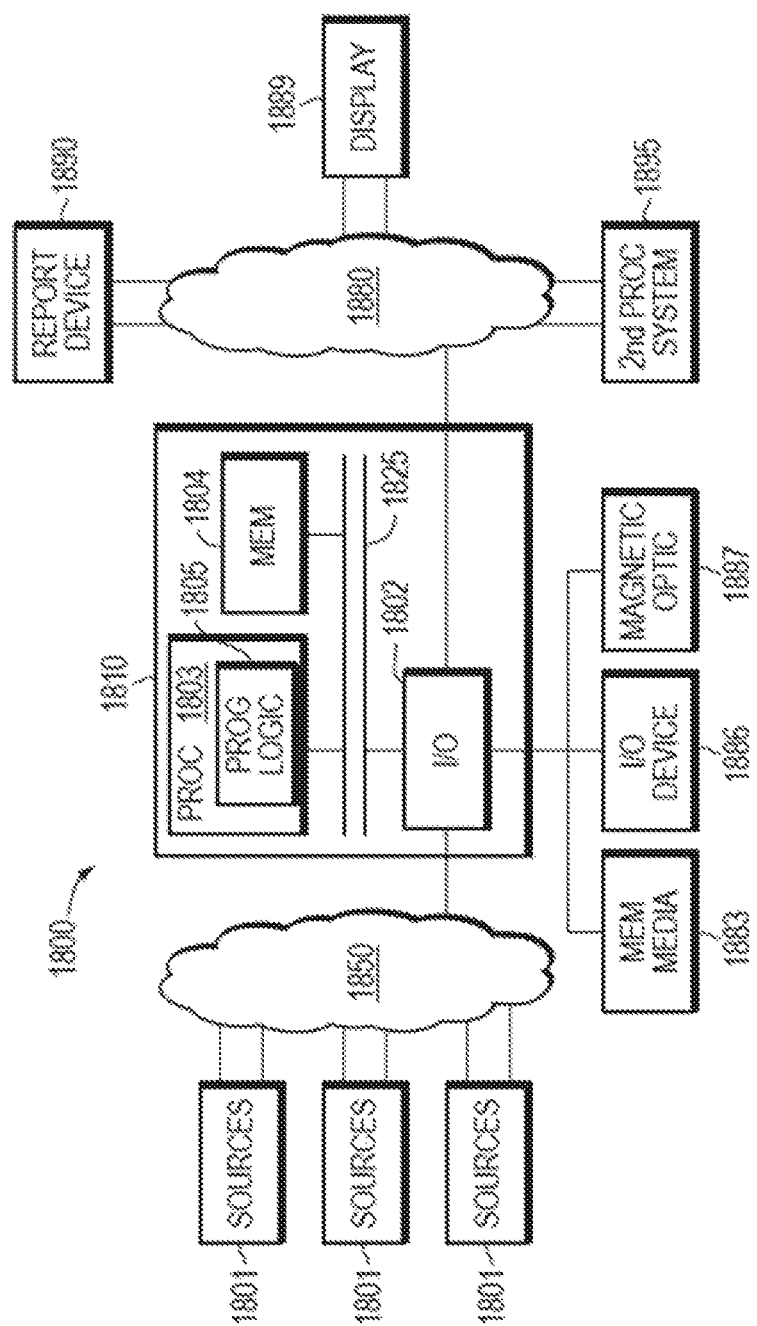
FIG. 18 is an example of an embodiment of an apparatus that may utilize the techniques described herein, in accordance with an embodiment of the present disclosure.

FIG. 18 is a block diagram illustrating an apparatus, such as a computer 1810 in a network 1800, which may utilize the techniques described herein according to an example embodiment of the present invention. The computer 1810 may include one or more I/O ports 1802, a processor 1803, and memory 1804, all of which may be connected by an interconnect 1825, such as a bus. Processor 1803 may include program logic 1805. The I/O port 1802 may provide connectivity to memory media 1883, I/O devices 1885, and drives 1887, such as magnetic or optical drives. When the program code is loaded into memory 1804 and executed by the computer 1810, the machine becomes an apparatus for practicing the invention. When implemented on one or more general-purpose processors 1803, the program code combines with such a processor to provide a unique apparatus that operates analogously to specific logic circuits. As such, a general purpose digital machine can be transformed into a special purpose digital machine.

Figure 19:
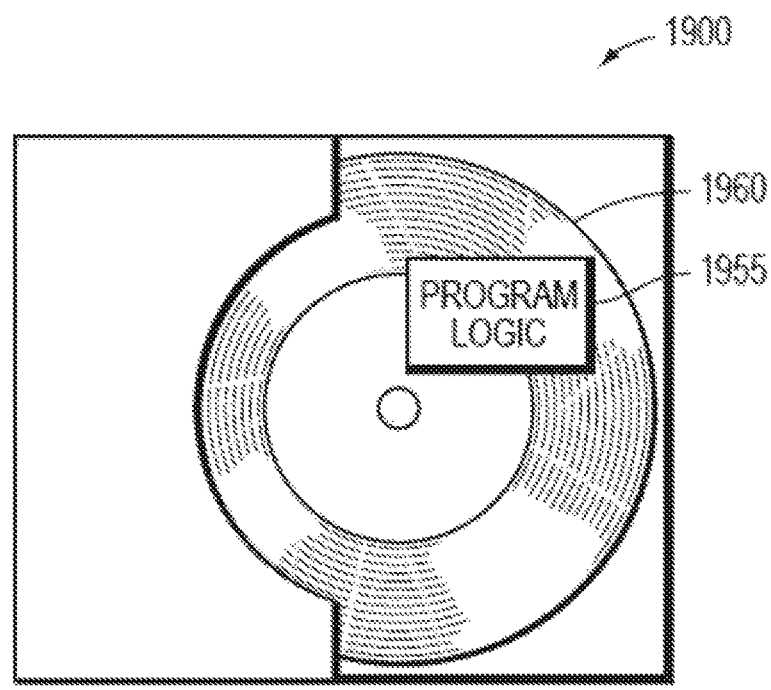
FIG. 19 is an example of a method embodied on a computer readable storage medium that may utilize the techniques described herein, in accordance with an embodiment of the present disclosure.

FIG. 19 is a block diagram illustrating a method embodied on a computer readable storage medium 1960 that may utilize the techniques described herein according to an example embodiment of the present invention. FIG. 19 shows Program Logic 1955 embodied on a computer-readable medium 1960 as shown, and wherein the Logic is encoded in computer-executable code configured for carrying out the methods of this invention and thereby forming a Computer Program Product 1900. Program Logic 1955 may be the same logic 1805 on memory 1804 loaded on processor 1803 in FIG. 18. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-19. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for providing access to data on a primary data storage including a production Logical Unit (LU) in communication with a backup storage and a Data Protection Appliance (DPA), the computer-executable method comprising:
   creating a snapshot of the production LU on the primary data storage;
   synthesizing a recovery snapshot at a Point in Time (PiT), wherein the recovery snapshot is the production LU at the PiT; and
   performing a restore operation on the snapshot of the production LU at the primary data storage using the recovery snapshot, wherein the snapshot, of the production LU is restored to the production LU at the PiT, thereby creating a second recovery snapshot;
   wherein the second recovery snapshot is enabled to be utilized as the production LU without affecting the production LU.

2. The computer-executable method of claim 1, further comprising:
   receiving a message prompting the DPA to commence creating the second recovery snapshot at the primary data storage.

3. The computer-executable method of claim 1, further comprising:
   testing the second recovery snapshot to determine whether an error present in the production LU is active in the second recovery snapshot.

4. The computer-executable method of claim 1, wherein the production LU on the primary data storage is enabled to be active while the data replication appliance is creating the snapshot.

5. The computer-executable method of claim 1, further comprising:
   exposing the second recovery snapshot as a Logical Unit (LU) from the primary data storage, thereby enabling a user to interact with data from the production LU without affecting access to the production LU.

6. The computer-executable method of claim 1, further comprising:
   modifying the second recovery snapshot, creating a modified recovery snapshot; and
   testing the modified recovery snapshot to determine whether an error is present in the modified recovery snapshot.

7. The computer-executable method of claim 1, further comprising:
   determining a list of differences between the recovery snapshot and the snapshot; and
   wherein the performing of the restore operation is based on the list of differences between the recovery snapshot and the snapshot.

8. A system, comprising:
   a primary data storage, including a production Logical Unit (LU), in communication with a backup storage and a Data Protection Appliance (DPA); and
   computer-executable program logic encoded in memory of one or more computers enabled to provide access on a primary data storage, wherein the computer-executable program logic is configured for the execution of:
   creating a snapshot of the production LU on the primary data storage;
   synthesizing a recovery snapshot at a Point in Time (PiT), wherein the recovery snapshot is the production LU at the PiT; and
   performing a restore operation on the snapshot of the production LU at, the primary data storage using the recovery snapshot, wherein the snapshot of the production LU is restored to the production LU at the PiT, thereby creating a second recovery snapshot;
   wherein the second recovery snapshot is enabled to be utilized as the production LU without affecting the production LU.

9. The system of claim 8, wherein the computer-executable program logic is further configured for the execution of:
   receiving a message prompting the DPA to commence creating the second recovery snapshot at the primary data storage.

10. The system of claim 8, wherein the computer-executable program logic is further configured for the execution of:
    testing the second recovery snapshot to determine whether an error present in the production LU is active in the second recovery snapshot.

11. The system of claim 8, wherein the production LU on the primary data storage is enabled to be active while the data replication appliance is creating the snapshot.

12. The system of claim 8, wherein the computer-executable program logic is further configured for the execution of:
    exposing the second recovery snapshot as a Logical Unit (LU) from the primary data storage, thereby enabling a user to interact with data from the production LU without affecting access to the production LU.

13. The system of claim 8, wherein the computer-executable program logic is further configured for the execution of:
    modifying the second recovery snapshot, creating a modified recovery snapshot; and
    testing the modified recovery snapshot to determine whether an error is present in the modified recovery snapshot.

14. The system of claim 8, wherein the computer-executable program logic is further configured for the execution of:
    determining a list of differences between the recovery snapshot and the snapshot; and
    wherein the performing of the restore operation is based on the list of differences between the recovery snapshot and the snapshot.

15. A computer program product for providing access to data on a primary data storage including a production Logical Unit (LU) in communication with a backup storage and a Data Protection Appliance (DPA), the computer program product comprising:
    a non-transitory computer readable storage medium encoded with computer-executable code, the code configured to enable the execution of:
    creating a snapshot of the production LU on the primary data storage;
    synthesizing a recovery snapshot at a Point in Time (PiT), wherein the recovery snapshot is the production LU at the PiT; and
    performing a restore operation on the snapshot of the production LU at the primary data storage using the recovery snapshot, wherein the snapshot of the production LU is restored to the production LU at the PiT, thereby creating a second recovery snapshot;
    wherein the second recovery snapshot is enabled to be utilized as the production LU without affecting the production LU.

16. The computer program product of claim 15, the code further configured to enable the execution of:
    receiving a message prompting the DPA to commence creating the second, recovery snapshot at the primary data storage.

17. The computer program product of claim 15, the code further configured to enable the execution of:
  testing the second recovery snapshot to determine whether an error present in the production LU is active in the second recovery snapshot.

18. The computer program product of claim 15, wherein the production LU on the primary data storage is enabled to be active while the data replication appliance is creating the snapshot.

19. The computer program product of claim 15, the code further configured to enable the execution of:
  exposing the second recovery snapshot as a Logical Unit (LU) from the primary data storage, thereby enabling a user to interact with data from the production LU without affecting access to the production LU.

20. The computer program product of claim 15, the code further configured to enable the execution of:
  modifying the second recovery snapshot, creating a modified recovery snapshot; and
  testing the modified recovery snapshot to determine whether an error is present in the modified recovery snapshot.

* * * * *